United States Patent [19]

Kamen et al.

[11] Patent Number: 5,701,965

[45] Date of Patent: Dec. 30, 1997

[54] HUMAN TRANSPORTER

[75] Inventors: Dean L. Kamen, Bedford; Robert R. Ambrogi, Manchester; Robert J. Duggan, Northwood; Richard K. Heinzmann, Francestown; Brian R. Key, Pelham; Andrzej Skoskiewicz, Manchester; Phyllis K. Kristal, Sunapee, all of N.H.

[73] Assignee: Deka Products Limited Partnership, Manchester, N.H.

[21] Appl. No.: 250,693

[22] Filed: May 27, 1994

Related U.S. Application Data

[63] Continuation-in-part of Ser. No. 21,789, Feb. 24, 1993, abandoned.

[51] Int. Cl.$^6$ ............................................. B62D 61/12
[52] U.S. Cl. ...................... 180/7.1; 180/6.5; 180/8.2; 180/21; 180/65.8; 180/907; 280/5.26; 364/176; 364/463
[58] Field of Search ........................ 180/7.1, 8.2, 8.3, 180/8.5, 8.6, 65.1, 65.8, 907, 118, 6.48, 6.5, 6.54, 41, 21; 901/1; 364/176, 463, 424.05, 424.06, 434; 280/5.2, 5.26, 5.28, 5.32, 6.1, 205, DIG. 10

[56] References Cited

U.S. PATENT DOCUMENTS

| | | | |
|---|---|---|---|
| 849,270 | 4/1907 | Schafer et al. | 280/5.26 |
| 2,742,973 | 4/1956 | Johannesen | 280/DIG. 10 X |
| 3,260,324 | 7/1966 | Saurez | 180/10 |
| 3,399,742 | 9/1968 | Malick | 180/21 |
| 3,515,401 | 6/1970 | Gross | 280/5.26 |
| 3,596,298 | 8/1971 | Durst, Jr. | 5/81 |
| 3,860,264 | 1/1975 | Douglas et al. | 280/266 |
| 3,872,945 | 3/1975 | Hickman et al. | 180/65 R |
| 3,952,822 | 4/1976 | Udden et al. | 180/907 |
| 4,018,440 | 4/1977 | Deutsch | 272/70.3 |
| 4,062,558 | 12/1977 | Wasserman | 280/205 |

(List continued on next page.)

FOREIGN PATENT DOCUMENTS

| | | | |
|---|---|---|---|
| 098027 | 5/1951 | France | 280/DIG. 10 |
| 3411489 | 10/1984 | Germany | 180/907 |

(List continued on next page.)

OTHER PUBLICATIONS

Vos, D. "Dynamics and Nonlinear Adaptive Control of An Autonomous Unicycle", Massachusetts Institute of Technology, (1989).

Vos, D. "Nonlinear Control of An Autonomous Unicycle Robot: Practical Issues", Massachusetts Institute of Technology, (1992).

(List continued on next page.)

Primary Examiner—Anne Marie Boehler
Attorney, Agent, or Firm—Bromberg & Sunstein LLP

[57] ABSTRACT

There is provided, in a preferred embodiment, a device for transporting a human subject over ground having a surface that may be irregular and may include stairs. This embodiment has a support for supporting the subject. A ground-contacting module, movably attached to the support, serves to suspend the subject in the support over the surface. The orientation of the ground-contacting module defines fore-aft and lateral planes intersecting one another at a vertical. The support and the ground-contacting module are components of an assembly. A motorized drive, mounted to the assembly and coupled to the ground-contacting module, causes locomotion of the assembly and the subject therewith over the surface. Finally, the embodiment has a control loop, in which the motorized drive is included, for dynamically enhancing stability in the fore-aft plane by operation of the motorized drive in connection with the ground-contacting module. The ground contacting module may be realized as a pair of ground-contacting members, laterally disposed with respect to one another. The ground-contacting members may be wheels. Alternatively, each ground-contacting member may include a cluster of wheels. In another embodiment, each ground-contacting member includes a pair of axially adjacent and rotatably mounted arcuate element pairs.

54 Claims, 34 Drawing Sheets

U.S. PATENT DOCUMENTS

| | | | |
|---|---|---|---|
| 4,109,741 | 8/1978 | Gabriel | 180/21 |
| 4,111,445 | 9/1978 | Haibeck | 280/79.3 |
| 4,264,082 | 4/1981 | Fouchey, Jr. | 280/5.26 |
| 4,266,627 | 5/1981 | Lauber | 180/8.3 |
| 4,293,052 | 10/1981 | Daswick et al. | 180/219 |
| 4,363,493 | 12/1982 | Veneklasen | 280/11.2 |
| 4,510,956 | 4/1985 | King | 135/67 |
| 4,560,022 | 12/1985 | Kassai | 180/65.1 |
| 4,657,272 | 4/1987 | Davenport | 280/266 |
| 4,685,693 | 8/1987 | Vadjunec | 280/242 WC |
| 4,709,772 | 12/1987 | Brunet | 280/5.26 |
| 4,740,001 | 4/1988 | Torleumke | 280/11.115 |
| 4,746,132 | 5/1988 | Eagan | 280/1.13 |
| 4,770,410 | 9/1988 | Brown | 272/70.3 |
| 4,786,069 | 11/1988 | Tang | 280/221 |
| 4,790,400 | 12/1988 | Sheeter | 180/8.1 |
| 4,790,548 | 12/1988 | Decelles | 280/5.26 |
| 4,794,999 | 1/1989 | Hester | 280/5.26 |
| 4,798,255 | 1/1989 | Wu | 180/907 |
| 4,802,542 | 2/1989 | Houston et al. | 180/65.5 |
| 4,809,804 | 3/1989 | Houston et al. | 180/65.5 |
| 4,834,200 | 5/1989 | Kajita | 180/8.2 |
| 4,863,182 | 9/1989 | Chern | 280/266 |
| 4,867,188 | 9/1989 | Reid | 135/67 |
| 4,869,279 | 9/1989 | Hedges | 135/67 |
| 4,890,853 | 1/1990 | Olson | 280/87.021 |
| 4,953,851 | 9/1990 | Sherlock et al. | 272/70.3 |
| 4,985,947 | 1/1991 | Ethridge | 5/81 R |
| 5,002,295 | 3/1991 | Lin | 280/205 |
| 5,011,171 | 4/1991 | Cook | 280/221 |
| 5,158,493 | 10/1992 | Morgrey | 180/8.6 |
| 5,221,883 | 6/1993 | Takenaka et al. | 180/8.1 |
| 5,241,875 | 9/1993 | Kochanneck | 180/8.6 |
| 5,248,007 | 9/1993 | Watkins | 280/DIG. 10 |
| 5,314,034 | 5/1994 | Chittal | 280/205 |
| 5,350,033 | 9/1994 | Kraft | 180/8.2 |
| 5,366,036 | 11/1994 | Perry | 180/6.5 |

FOREIGN PATENT DOCUMENTS

| | | | |
|---|---|---|---|
| 59-73372 | 4/1984 | Japan | 280/5.26 |
| 0255580 | 12/1985 | Japan | 180/86 |
| 61-31685 | 2/1986 | Japan . | |
| 0305082 | 12/1988 | Japan | 180/209 |
| 2-190277 | 7/1990 | Japan . | |
| 2190277 | 7/1990 | Japan | 901/1 |
| 5-213240 | 8/1993 | Japan . | |
| 1213930 | 11/1970 | United Kingdom | 280/5.26 |
| 8605752 | 10/1986 | WIPO | 280/5.26 |
| WO 89/06117 | 7/1989 | WIPO . | |

OTHER PUBLICATIONS

Koyanagi et al., "A Wheeled Inverse Pendulum Type Self-Contained Mobile Robot and Its Posture Control and Vehicle Control", *The Society of Instrument and Control Engineers*, Special issue of the 31st SICE Annual Conference, Japan (1992), pp. 13–16.

Koyanagi et al, "A Wheeled Inverse Pendulum Type Self-Contained Mobile Robot", *The Society of Instrument and Control Engineers*, Special issue of the 31st SICE Annual Conference, Japan (1992), pp. 51–56.

Koyanagi et al., "A Wheeled Inverse Pendulum Type Self-Contained Mobile Robot and its Two Dimensional Trajectory Control", *Proceedings of the Second International Symposium on Measurement and Control in Robotics*, Japan (1992), pp. 891–898.

Watson Industries, Inc., Vertical Reference Manual ADS–C132–1A and ADS–C232–1A, (1992), pp. 3–4.

News article "Amazing Wheelchair Goes Up and Down Stairs".

Schoonwinkel, A. "Design and Test of a Computer-Stabilized Unicylce", Stanford University (1988), UMI Dissertation Services.

Osaka et al., "Stabilization of Unicyle", *Systems and Control*, vol. 25, No. 3, Japan (1981), pp. 159–166 (Abstract only).

Roy et al., "Five-Wheel Unicycle System", *Medical & Biological Engineering & Computing*, vol. 23, No. 6, United Kingdom (1985), pp. 593–596.

Kawaji, S., "Stabilization of Unicycle Using Spinning Motion", *Denki Gakkai Ronbushi, D*, vol. 107, Issue 1, Japan (1987), pp. 21–28 (Abstract only).

Schoonwinkel, A., "Design and Test of a Computer-Stabilized Unicycle", *Dissertation Abstracts International*, vol. 49/03–B, Stanford University (1988), pp. 890–1294 (Abstract only).

Vos et al., "Dynamics and Nonlinear Adaptive Control of an Autonomous Unicycle—Theory and Experiment", *American Institute of Aeronautics and Astronautics*, A90–26772 10–39, Washington, D.C. (1990), pp. 487–494 (Abstract only).

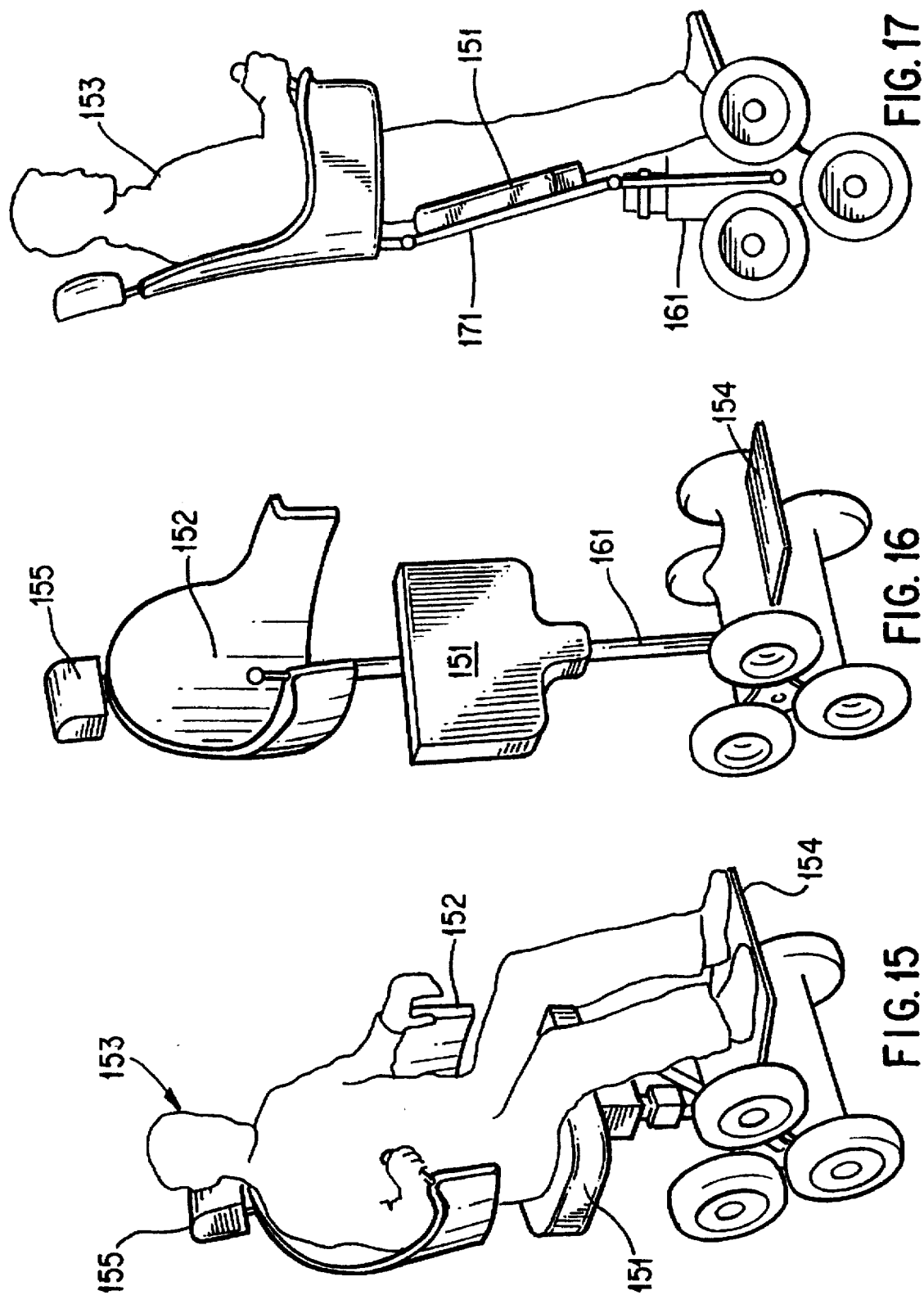

HUMAN TRANSPORTER

This application is a continuation in part of U.S. application Ser. No. 08/021,789, filed Feb. 24, 1993, now abandoned, which is hereby incorporated herein by reference.

TECHNICAL FIELD

The present invention pertains to devices and methods for transporting human subjects, including those experiencing physical handicaps or incapacitation, and more particularly to devices and methods for transporting human subjects over regions that may include stairs.

BACKGROUND ART

A wide range of devices and methods are known for transporting human subjects experiencing physical incapacitation. The design of these devices has generally required a compromise to address the physical incapacity of the users. Stability has been deemed essential, so relative ease of locomotion is generally compromised. It becomes difficult to provide a self-propelled user-guidable device for transporting a physically handicapped or other person up and down stairs while still permitting convenient locomotion along regions that do not include stairs. Devices that achieve the climbing of stairs tend to be complex, heavy, and difficult for ordinary locomotion.

SUMMARY OF THE INVENTION

The invention provides, in a preferred embodiment, a device for transporting a human subject over ground having a surface that may be irregular and may include stairs. This embodiment has a support for supporting the subject. A ground-contacting module, movably attached to the support, serves to suspend the subject in the support over the surface. The orientation of the ground-contacting module defines fore-aft and lateral planes intersecting one another at a vertical. The support and the ground-contacting module are components of an assembly. A motorized drive, mounted to the assembly and coupled to the ground-contacting module, causes locomotion of the assembly and the subject therewith over the surface. Finally, the embodiment has a control loop, in which the motorized drive is included, for dynamically enhancing stability in the fore-aft plane by operation of the motorized drive in connection with the ground-contacting module.

In a further embodiment, the ground contacting module is realized as a pair of ground-contacting members, laterally disposed with respect to one another. The ground-contacting members may be wheels. Alternatively, each ground-contacting member may include a cluster of wheels, each cluster being rotatably mounted on and motor-driven about a common laterally disposed central axis; each of the wheels in each cluster may be rotatably mounted about an axis parallel to the central axis so that the distance from the central axis through a diameter of each wheel is approximately the same for each of the wheels in the cluster. The wheels are motor-driven independently of the cluster.

In yet another embodiment, each ground-contacting member includes a pair of axially adjacent and rotatably mounted arcuate element pairs. The arcuate elements of each element pair are disposed transversely at opposing ends of a support strut that is rotatably mounted at its midpoint. Each support strut is motor-driven.

BRIEF DESCRIPTION OF THE DRAWINGS

The invention will be more readily understood by reference to the following description, taken with the accompanying drawings, in which:

FIGS. 9–21 illustrate embodiments of the invention utilizing a pair of wheel clusters as the ground-contacting members;

FIGS. 9–10 show use of a two-wheel cluster design in various positions;

FIGS. 11–21 show use of a three-wheel cluster design in various positions and configurations;

FIG. 36 is a schematic for the control arrangement for the cluster motors in the first embodiment permitting climbing, here employing a lean mode;

FIG. 37 is a schematic for the control arrangement for the wheel motors in the first embodiment permitting climbing;

3

Figure 38:
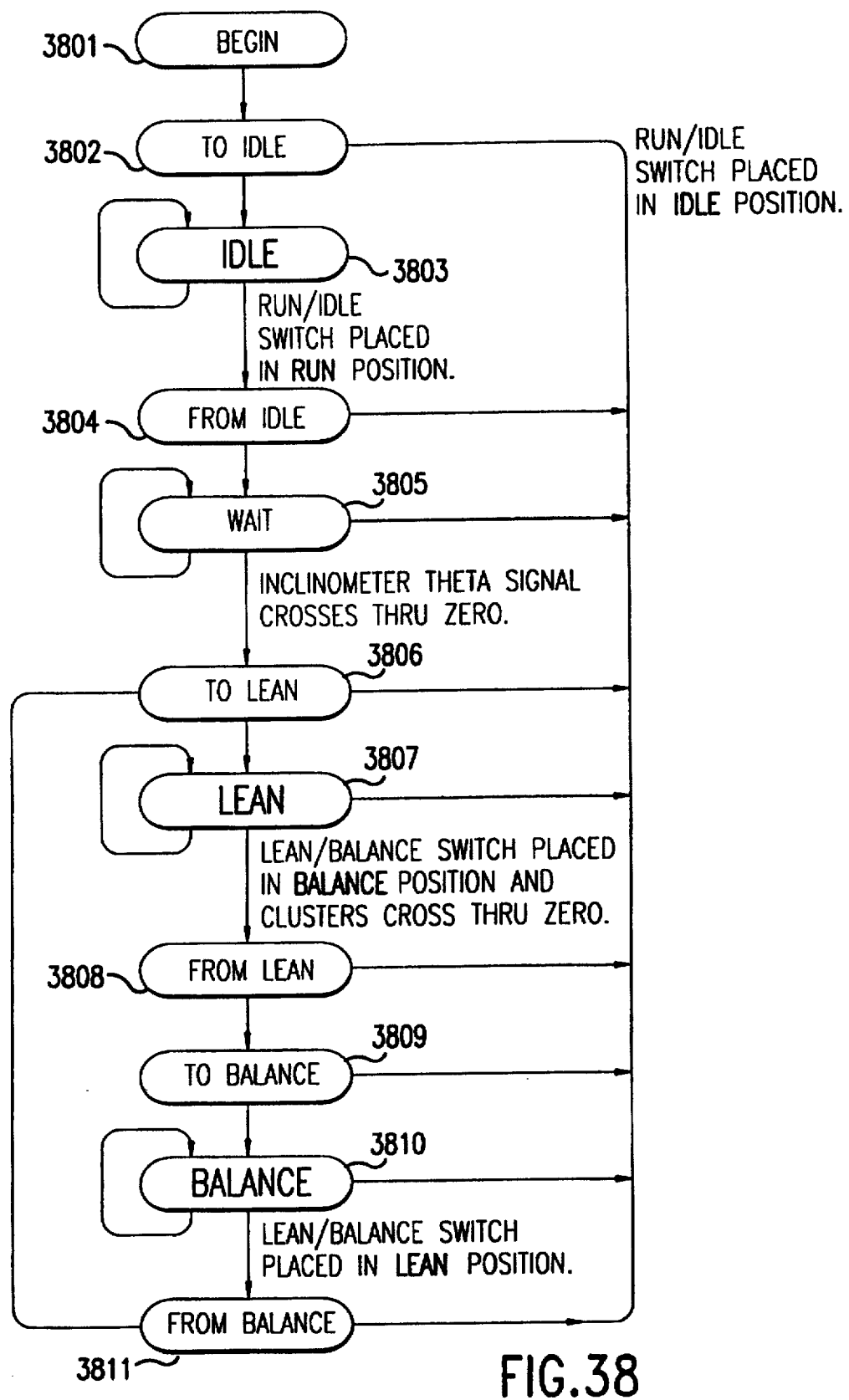
Figure 39B:
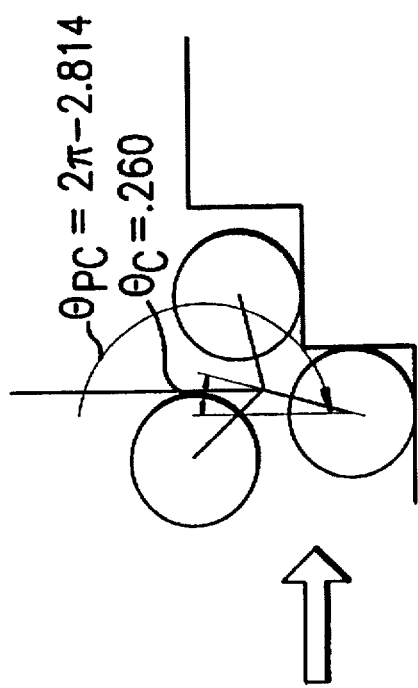
Figure 39A:
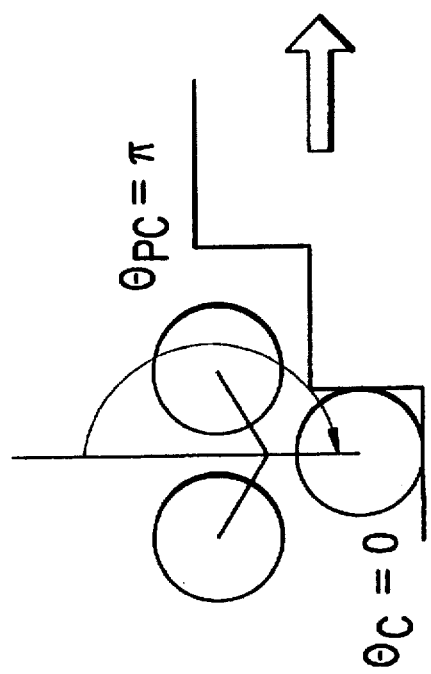
Figure 40A:
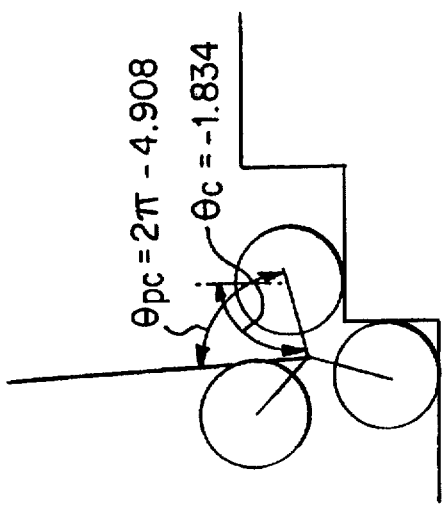
Figure 41A:
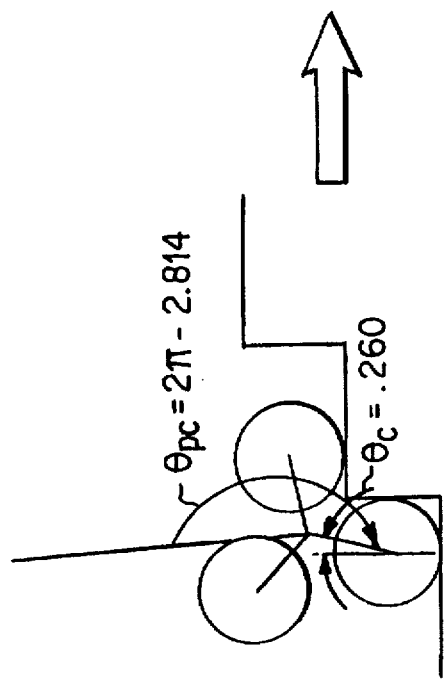
Figure 40B:
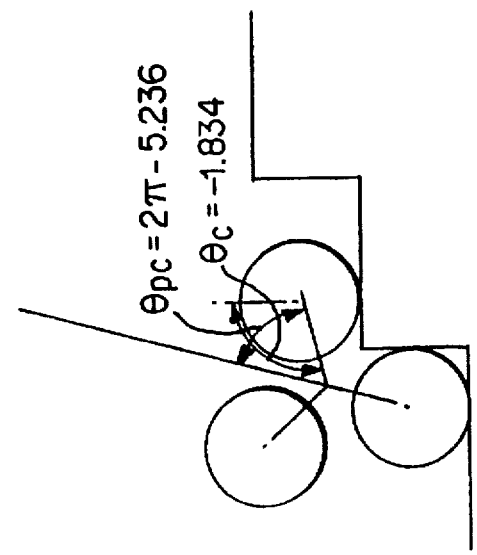
Figure 41B:
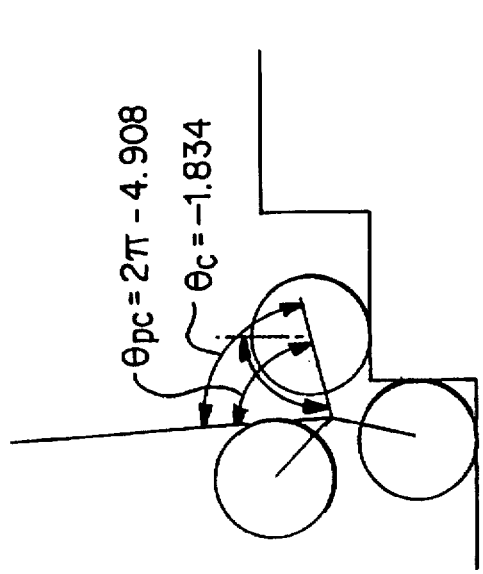
Figure 42C:
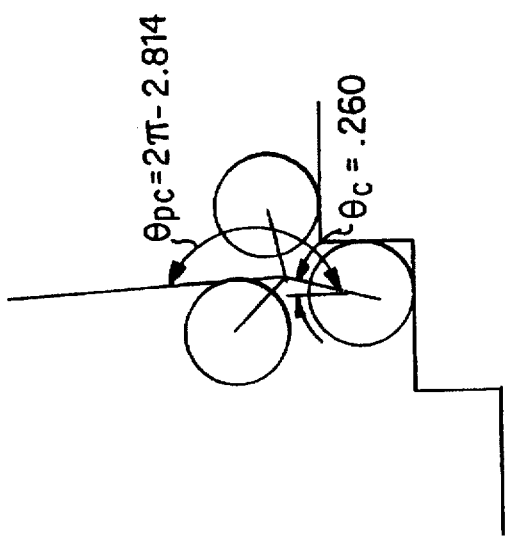
Figure 42B:
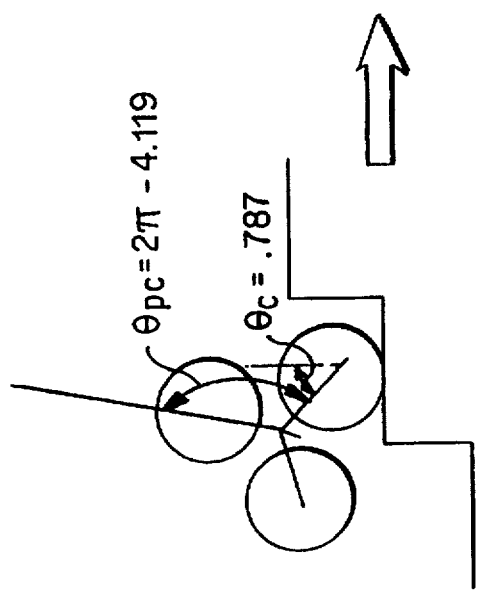
Figure 42A:
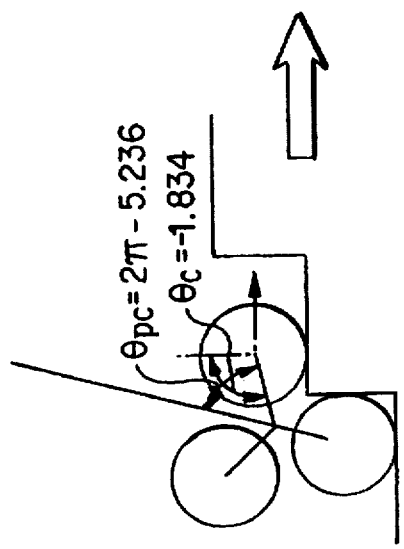
Figure 43:
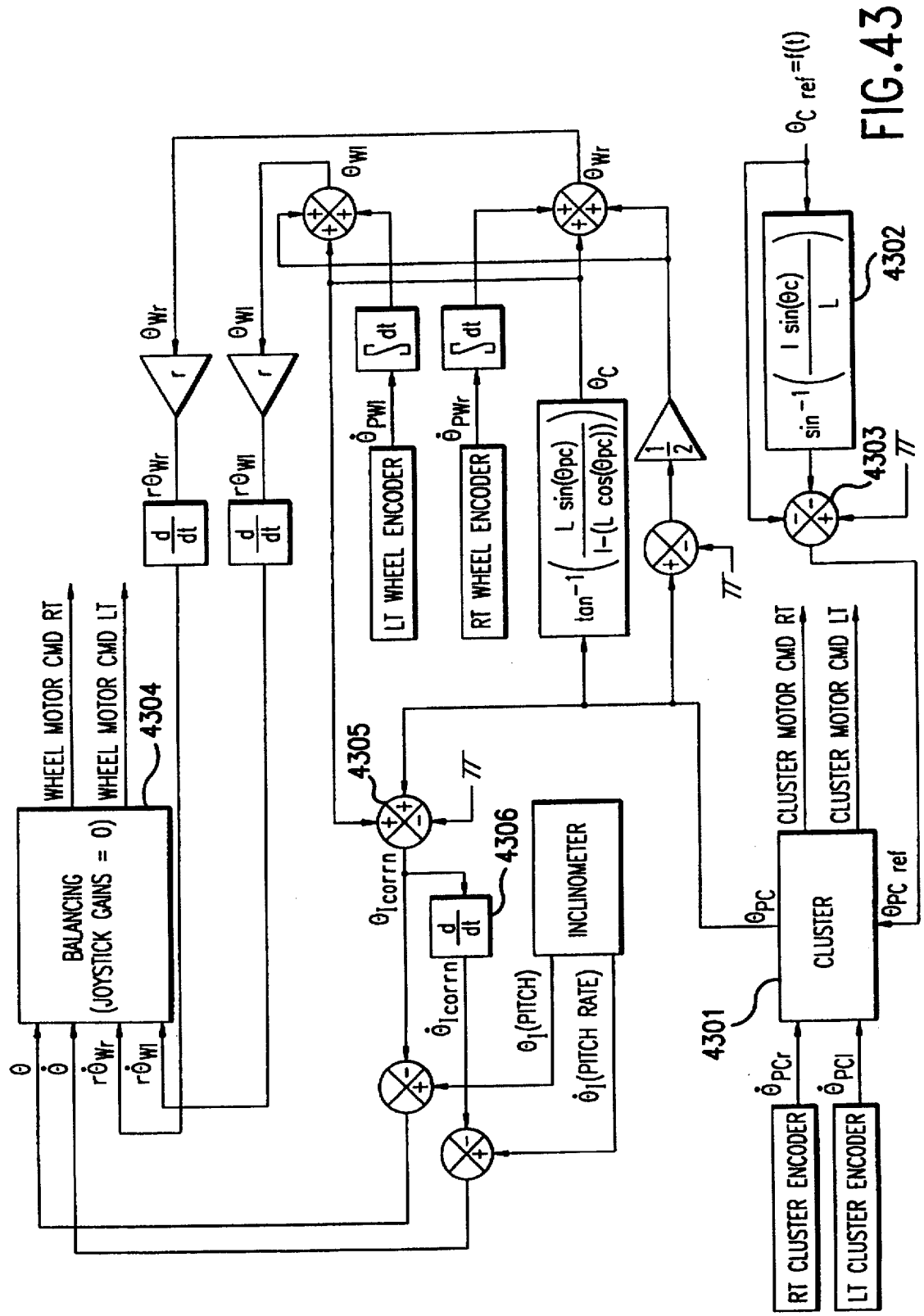
Figure 44:
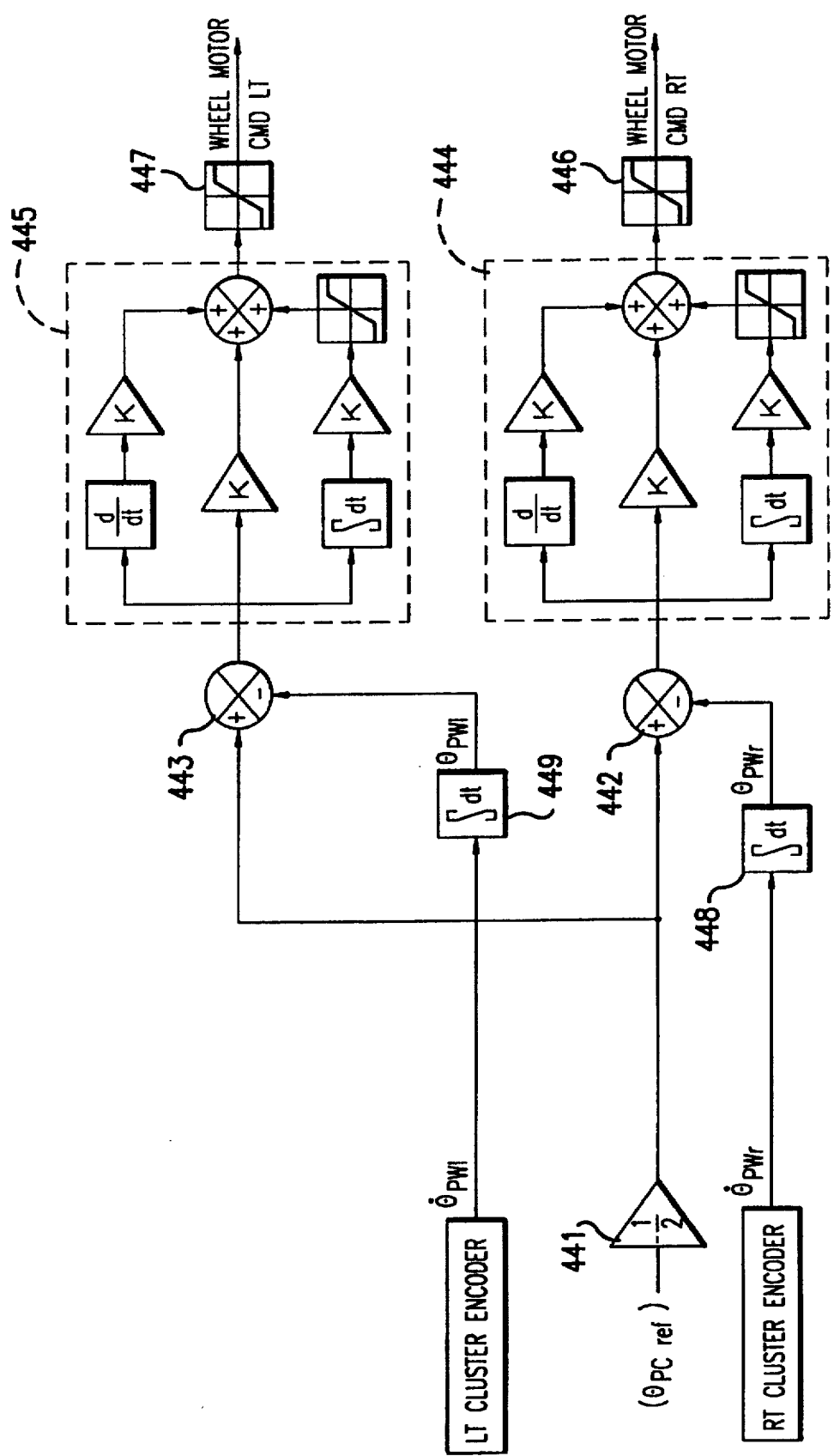
Figure 45:
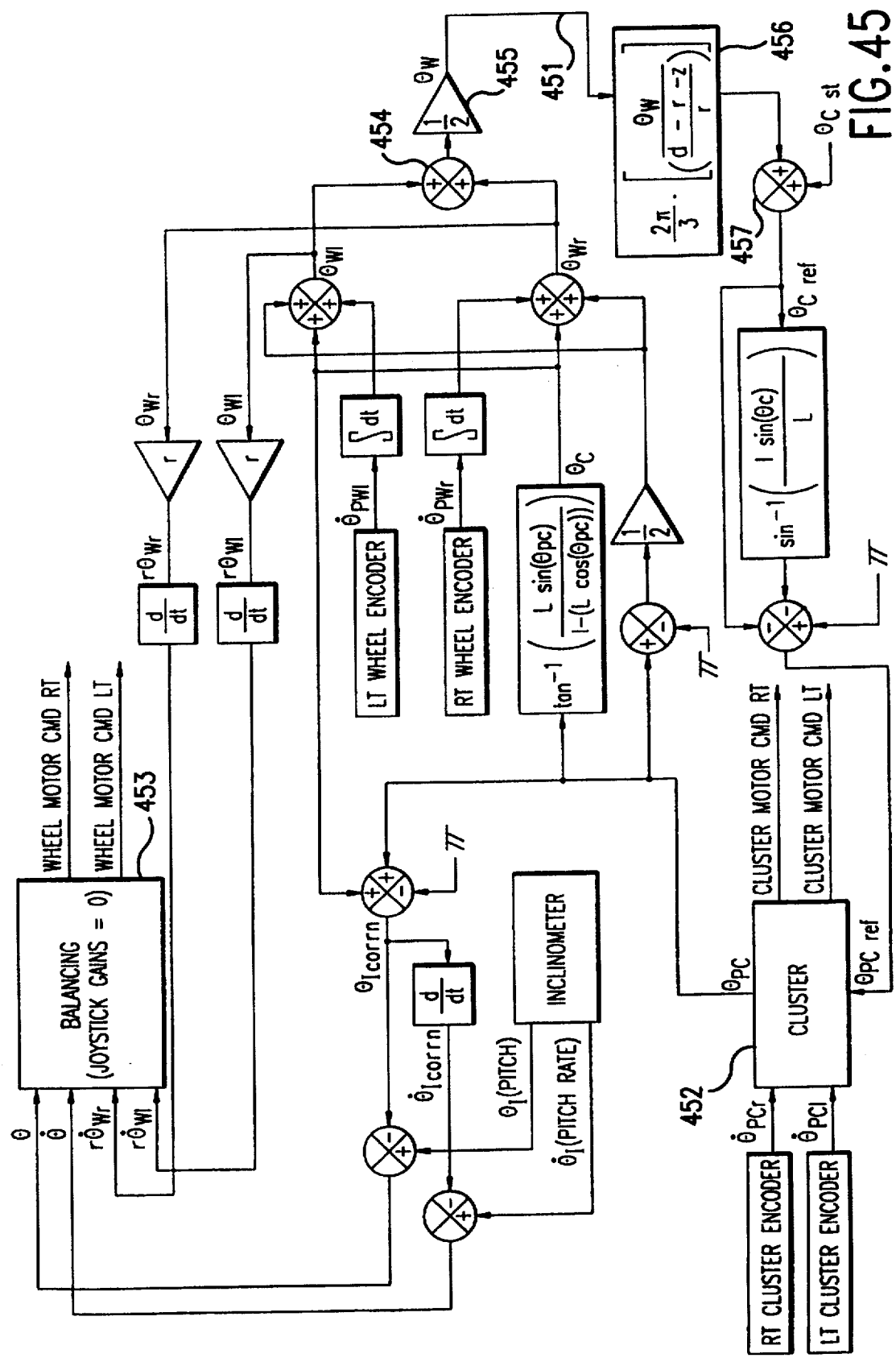

FIG. 38 is a block diagram of the state of the device, utilizing the first embodiment permitting climbing, for moving among idle, lean, and balance modes;

FIGS. 39A-B, 40A-B, 41A-B, and 42A-C illustrate stair-climbing achieved by the cluster design of FIGS. 11-26 in accordance a second embodiment permitting climbing;

FIGS. 39A and 39B illustrate orientation of the cluster in the sequence of starting stair climbing in accordance with the second climbing embodiment;

FIGS. 40A and 40B illustrate orientation of the cluster in the sequence of resetting the angle origins in this embodiment;

FIGS. 41A and 41B illustrate orientation of the cluster in the sequence of transferring weight in this embodiment;

FIGS. 42A, 42B, and 42C illustrate orientation of the cluster in the sequence of climbing in this embodiment;

FIG. 43 is a schematic for the control arrangement for the wheel and cluster motors during the start sequence of FIGS. 39A and 39B;

FIG. 44 is a schematic for the control arrangement for the wheel motors during the weight transfer sequence of FIGS. 41A and 41B; and FIG. 45 is a schematic for the control arrangement during the climb sequence of FIGS. 42A, 42B, and 42C.

DETAILED DESCRIPTION OF SPECIFIC EMBODIMENTS

The invention may he implemented in a wide range of embodiments. A characteristic of many of these embodiments is the use of a pair of laterally disposed ground-contacting members to suspend the subject over the surface with respect to which the subject is being transported. The ground-contacting members are motor-driven. In many embodiments, the configuration in which the subject is suspended during locomotion lacks inherent stability at least a portion of the time with respect to a vertical in the fore-aft plane hut is relatively stable with respect to a vertical in the lateral plane. Fore-aft stability is achieved by providing a control loop, in which the motor is included, for operation of the motor in connection with the ground-contacting members. As described below, the pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain the center of mass of the device above the point of contact of the ground-contacting members with the ground, regardless of disturbances and forces operative on the device.

Figure 1:
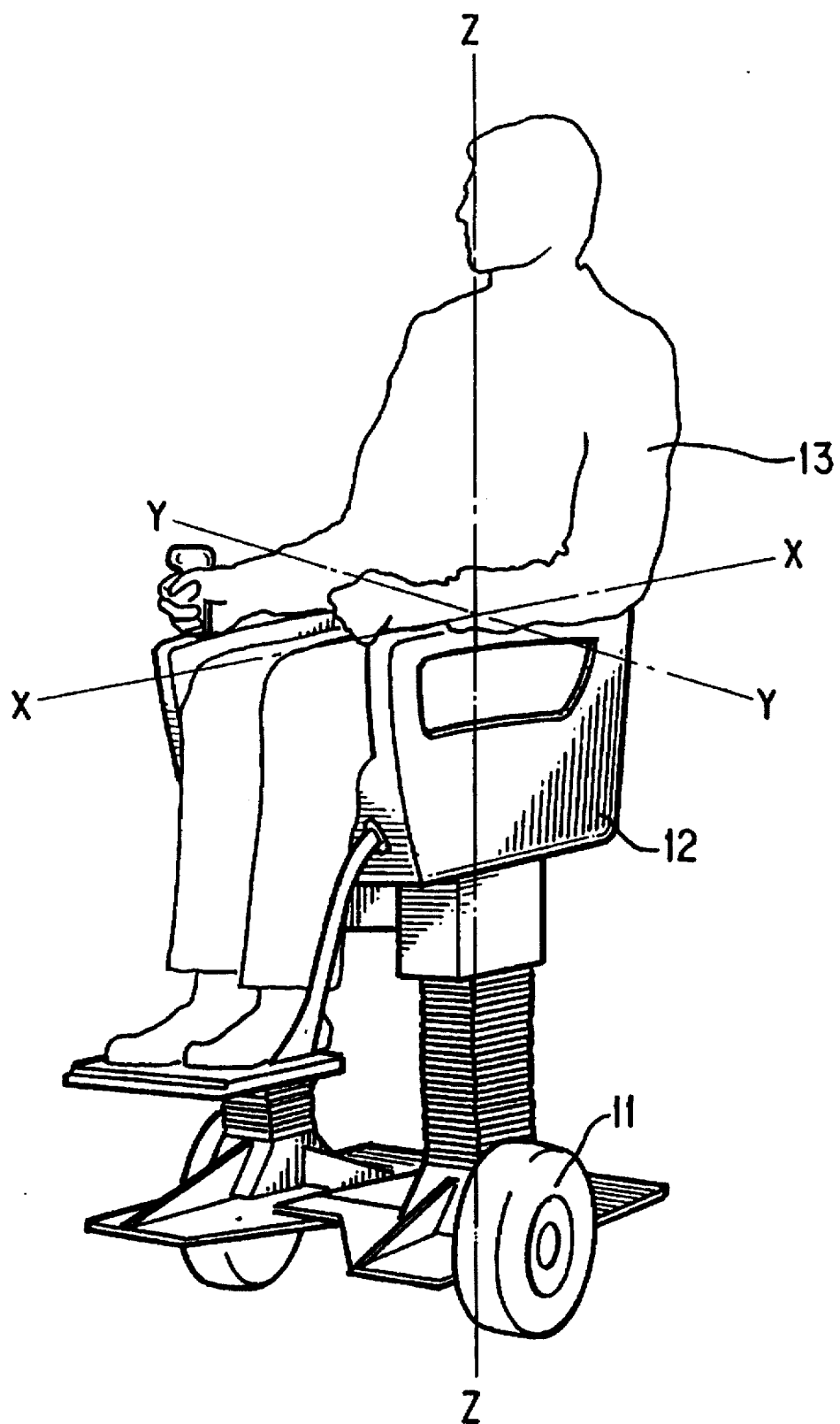
FIG. 1 is a perspective view of a simplified embodiment of the present invention, showing a subject seated thereon.

In FIG. 1 is shown a simplified embodiment of the invention in which the principal ground-contacting members are a pair of wheels and in which supplemental ground-contacting members are used in stair climbing and descending. (As will be shown below, stair climbing and descent and flat-terrain locomotion may both be achieved with a single set of ground-contacting members, when such members are the wheel clusters or the arcuate elements referred to above.)

The embodiment shown in FIG. 1 includes a support arrangement 12, embodied here as a chair, on which a subject 13 may be seated. The device is provided with a pair of wheels 11 disposed laterally with respect to one another. The wheels help to define a series of axes including the vertical axis Z—Z, a lateral axis Y—Y parallel to the axis of the wheels, and a fore-aft axis X—X perpendicular to the wheel axis. The plane defined by the vertical axis Z-Z and the lateral axis Y-Y will sometimes be referred to as the "lateral plane", and the plane defined by the fore-aft axis X-X and the vertical axis Z-Z will sometimes be referred to as the "fore-aft plane". Directions parallel to the axes X-X and Y-Y are called the fore-aft and lateral directions respectively. It can be seen that the device, when relying on the pair of wheels 11 for contacting the ground, is inherently unstable with respect to a vertical in the fore-aft direction, but is relatively stable with respect to a vertical in the lateral direction.

Figure 2:
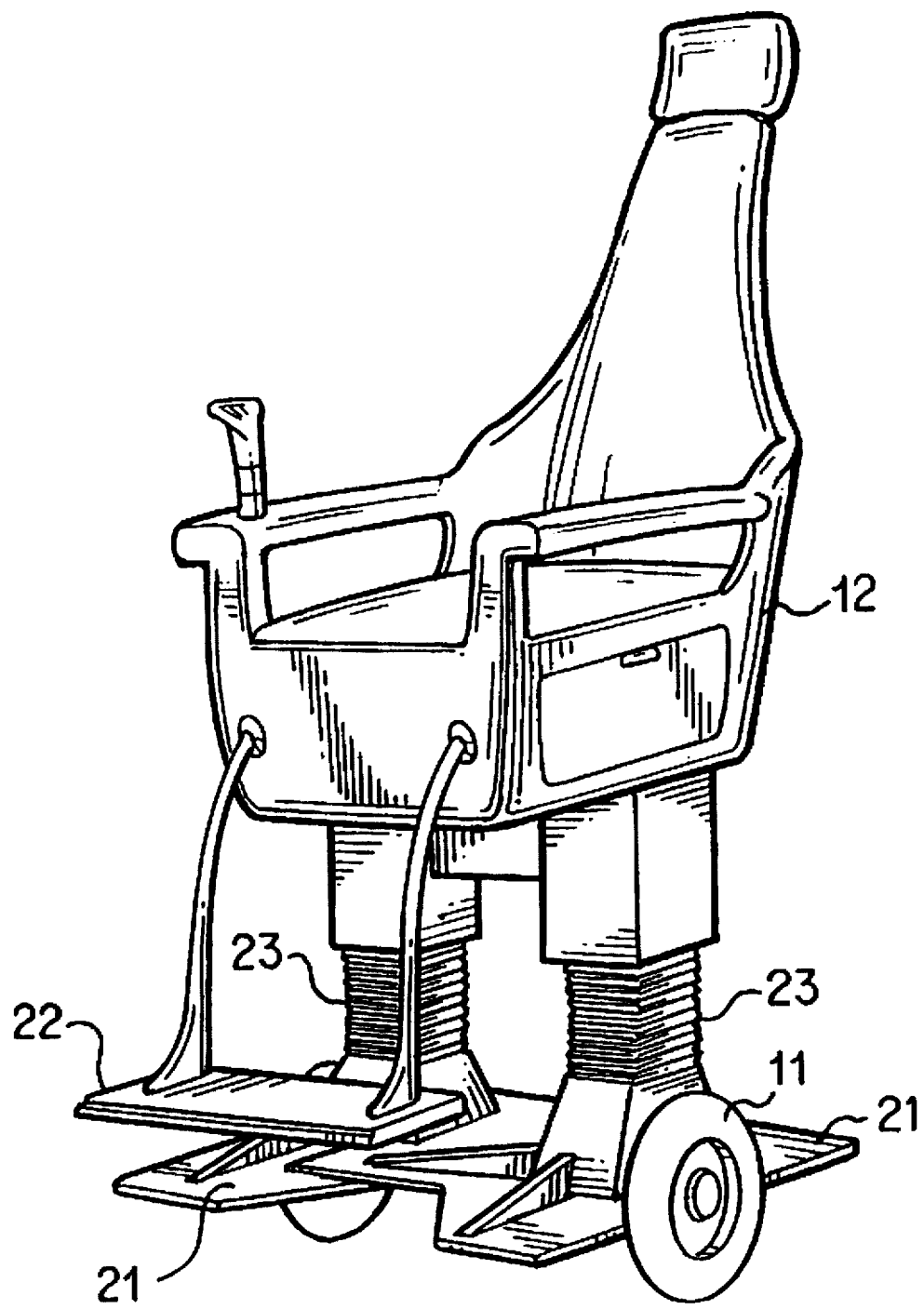
FIG. 2 another perspective view of the embodiment of FIG. 1, showing further details of the embodiment.

In FIG. 2 it can be seen that in addition to wheels 11, the device is provided with a pair of laterally disposed feet 21 capable of being extended in the vertical direction by controllable amounts, and a footrest 22. The footrests are here provided with sensors for determining the height of objects such as stairs over which they may be disposed. The feet 21 are disposed on a pair of corresponding extendable legs 23. In a preferred embodiment, the device is stable in the fore-aft direction as well as the lateral direction when both feet are in contact with the ground, but lateral stability may be sacrificed when one foot is in contact with the ground.

Figure 3:
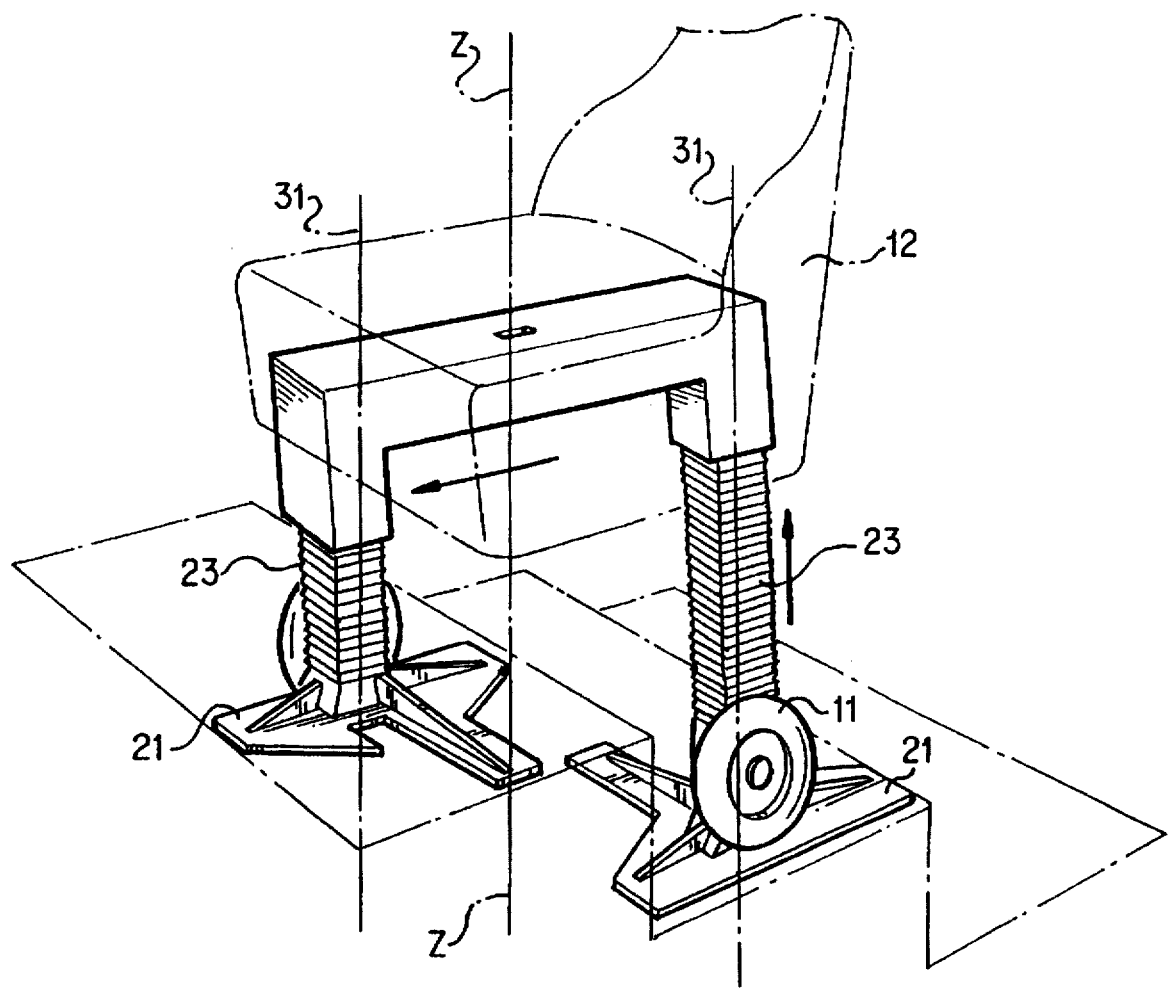
FIG. 3 is a schematic view of the embodiment of FIG. 1, showing the swivel arrangement of this embodiment.

In FIG. 3 is shown an arrangement of the embodiment of of FIGS. 1 and 2 permitting swivel of the chair 12 with respect to the suspension system, including feet 21 and related legs 23. The swivel operates in a plane that is approximately horizontal. The swivel arrangement, in combination with the ability to extend and retract each leg, permits motion of the device up and down stairs in a manner analogous to human locomotion on stairs. Each leg 23, when serving as the weight-bearing leg, permits rotation of the remainder of the device about the leg's vertical axis in the course of a swivel. In achieving the swivel, the chair pivots about a vertical axis disposed centrally between the legs 23 to maintain the chair's forward-facing direction. Additionally, the non-weight-bearing leg 23 is rotated about its vertical axis in the course of a swivel to maintain its related foot 21 in a forward-facing direction.

Figure 4:
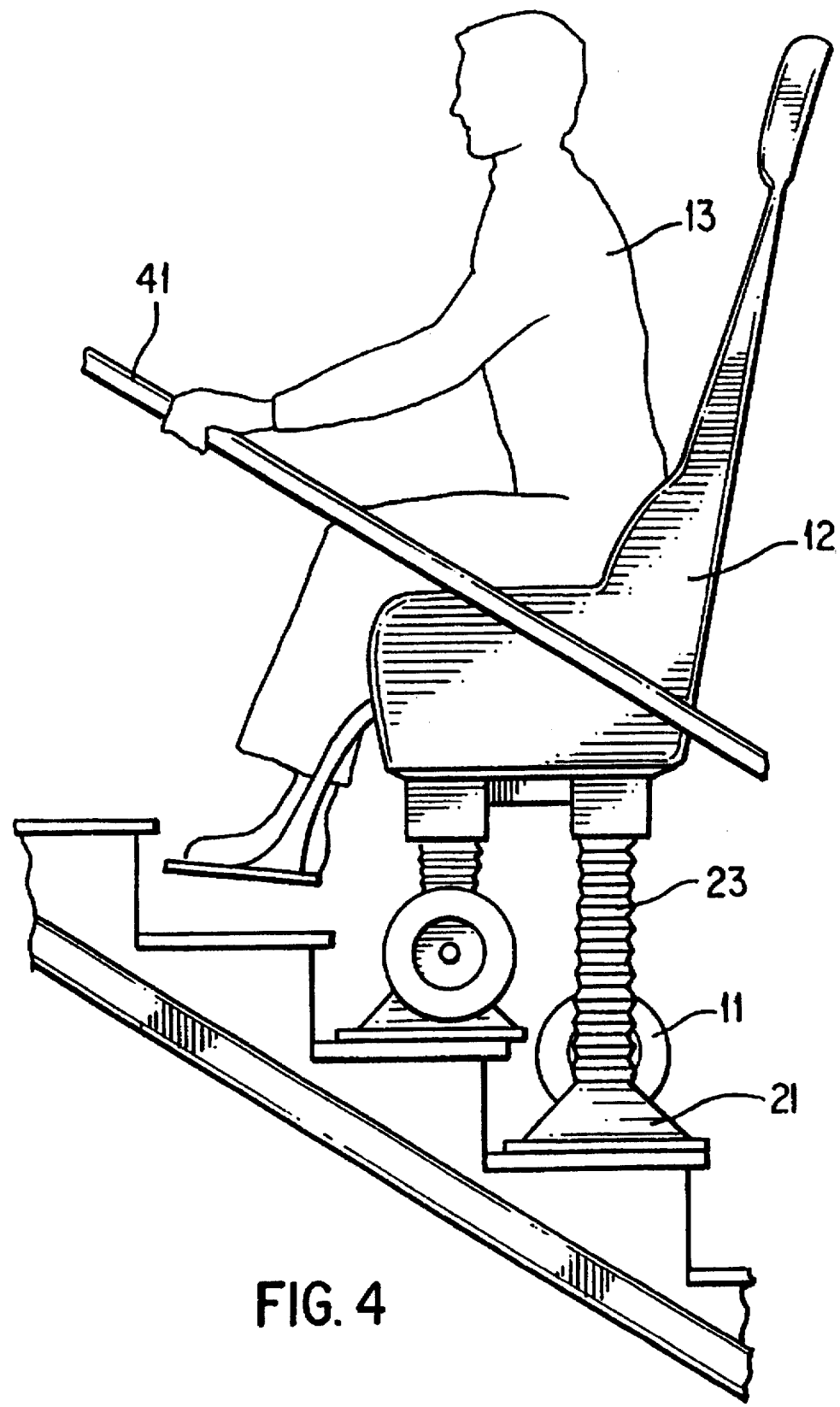
FIG. 4 is a side elevation of the embodiment of FIG. 1 as used for climbing stairs.

It can be seen that the embodiment described in FIGS. 1-3 sacrifices inherent fore-aft stability in order to achieve relative mobility. For generally gradual surface changes, the balance mode involves providing fore-aft stability to an otherwise inherently unstable system. For more irregular surfaces, such as stairs, this embodiment has a separate "step mode" used for climbing or descending stairs. Stability may be regained in climbing or descending stairs, for example, by using a hand to grab an ordinary handrail 41, as shown in FIG. 4, or even contacting an available wall near the stairs.

In addition, a variety of strategies may be used to reduce the risk of injury arising from a fall. In one arrangement, in the event that a fall is determined to be about to occur, the device may enter a squat mode in which it controllably and quickly lowers the center of mass of the combination of device and human subject. A lowering of the center of mass may be achieved, for example, by hinging or separating the suspension system in such a manner as to cause the height of the chair from the surface to be reduced. A squat mode could also have the beneficial effects of dissipating energy before imparting it to the subject, placing the subject in a position so as to reduce the subject's vulnerability, and putting the subject in a position that is lower so as to reduce the energy transferred to the person in case of impact.

Figure 5:
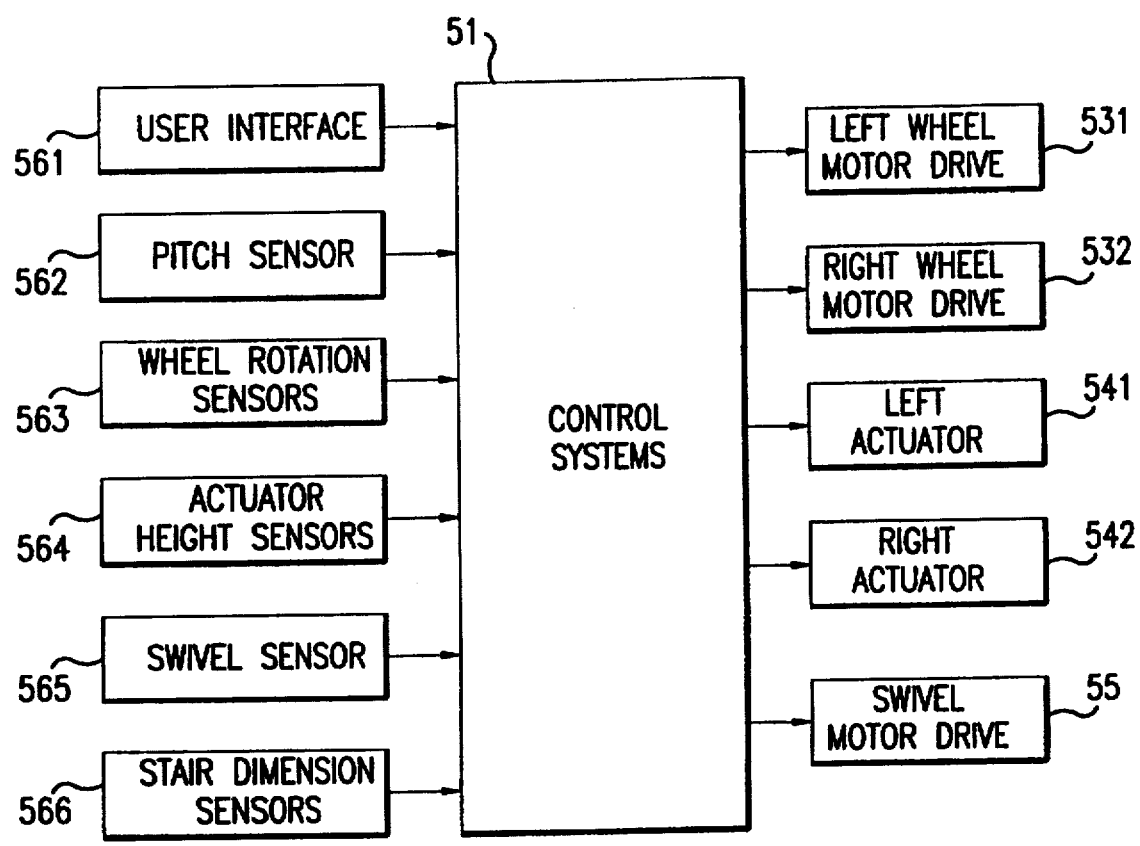
FIG. 5 is a block diagram showing generally the nature of power and control with the embodiment of FIG. 1.

In the block diagram of FIG. 5 it can be seen that a control system 51 is used to control the motor drives and actuators of the embodiment of FIGS. 1–4 to achieve locomotion and balance. These include motor drives 531 and 532 for left and right wheels respectively, actuators 541 and 542 for left and right legs respectively, and swivel motor drive 55. The control system has data inputs including user interface 561, pitch sensor 562 for sensing fore-aft pitch, wheel rotation sensors 563, actuator height sensor 564, swivel sensor 565, and stair dimension sensor 566.

Figure 6:
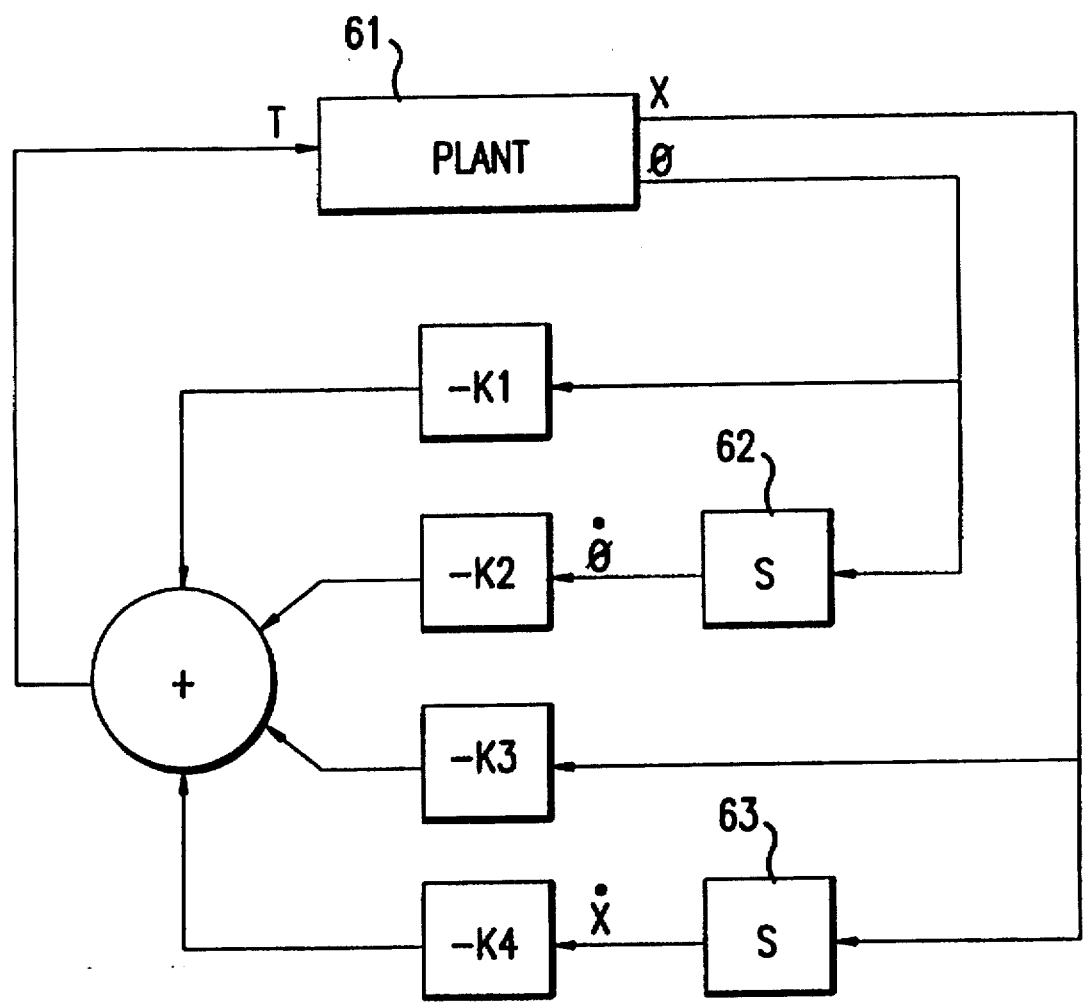
FIG. 6 illustrates the control strategy for a simplified version of FIG. 1 to achieve balance using wheel torque.

A simplified control algorithm for acieving balance in the embodiment of the invention according to FIG. 1 when the wheels are active for locomotion is shown in the block diagram of FIG. 6. The plant 61 is equivalent to the equations of motion of a system with a ground contacting module driven by a single motor, before the control loop is applied. T identifies the wheel torque. The character $\theta$ identifies the fore-aft inclination (the pitch angle of the device with respect to gravity, i.e., the vertical), X identifies the fore-aft displacement along the surface relative to the reference point, and the dot over a character denotes a variable differentiated with respect to time. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is set to satisfy the following equation:

$$T = K_1 \theta + K_2 \dot{\theta} + K_3 X + K_4 \dot{x}$$

The gains $K_1$, $K_2$, $K_3$, and $K_4$ are dependent upon the physical parameters of the system and other effects such as gravity. The simplified control algorithm of FIG. 6 maintains balance and also proximity to the reference point on the surface in the presence of disturbances such as changes to the system's center of mass with respect to the reference point on the surface due to body motion of the subject or contact with other persons or objects.

In order to accommodate two wheels instead of the one-wheel system illustrated in FIG. 6, the torque desired from the left motor and the torque desired from the right motor can be calculated separately in the general manner described below in connection with FIG. 33. Additionally, tracking both the left wheel motion and the right wheel motion permits adjustments to be made to prevent unwanted turning of the device and to account for performance variations between the two drive motors.

Figure 7:
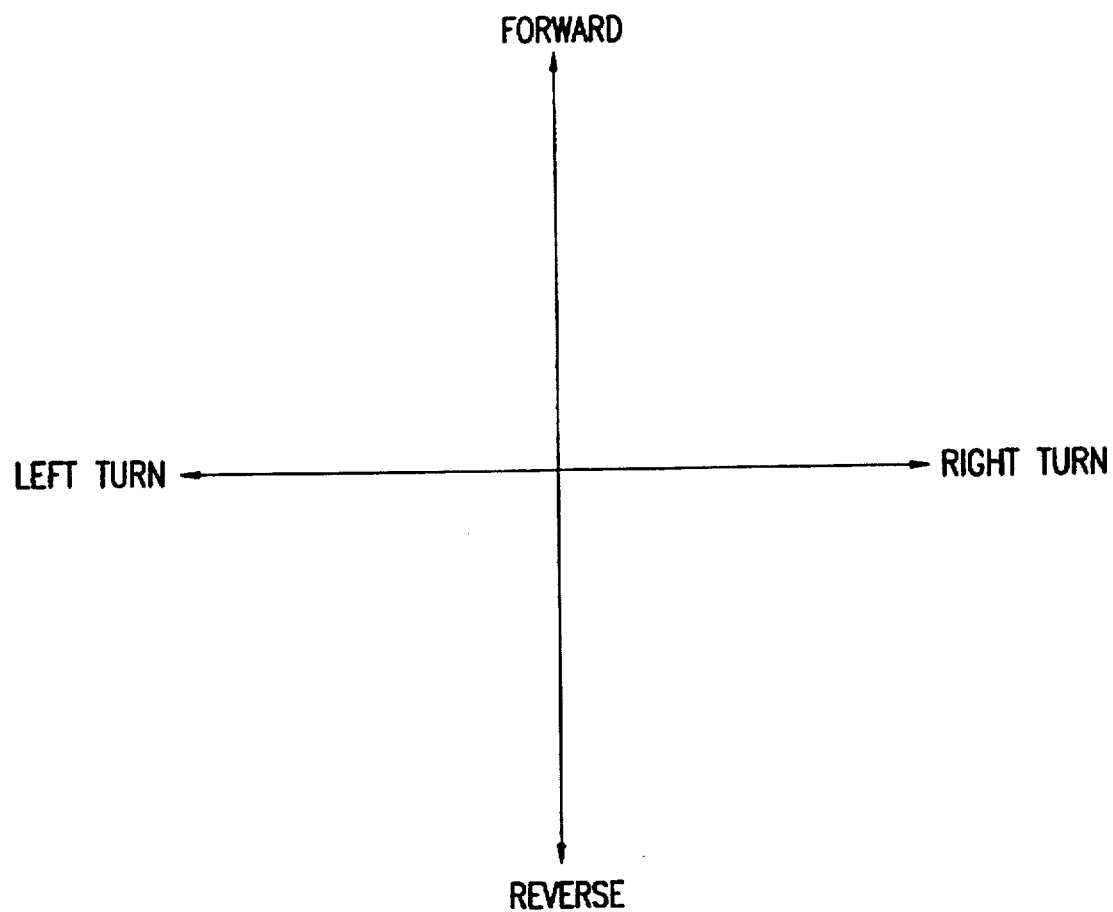
FIG. 7 illustrates diagrammatically the operation of joystick control of the wheels of the embodiments of FIG. 1.

A manual interface such as a joystick is used to adjust the torques of each motor. The joystick has axes indicated in FIG. 7. In operation of this embodiment, forward motions of the joystick is used to cause forward motion of the device, and reverse motion of the joystick causes backward motion of the device. A left turn similarly is accomplished by leftward motion of the joystick. For a right turn, the joystick is moved to the right. The configuration used here permits the device to turn in place when the joystick is moved to the left or to the right. With respect to forward and reverse motion an alternative to the joystick is simply leaning forward or backward, since the pitch sensor (measuring $\theta$) would identify a pitch change that the system would try to compensate for, leading to forward or reverse motion, depending on the direction of lean. Alternatively, control strategies based on fuzzy logic can be implemented.

It can be seen that the approach of adjusting motor torques when in the wheel mode permits fore-aft stability to be achieved without the necessity of additional stabilizing wheels or struts (although such aids to stability may also be provided). In other words, stability is achieved dynamically, by motion of the components of the device (in this case constituting the entire device) relative to the ground.

Stair-Climbing with Legs

Figure 8:
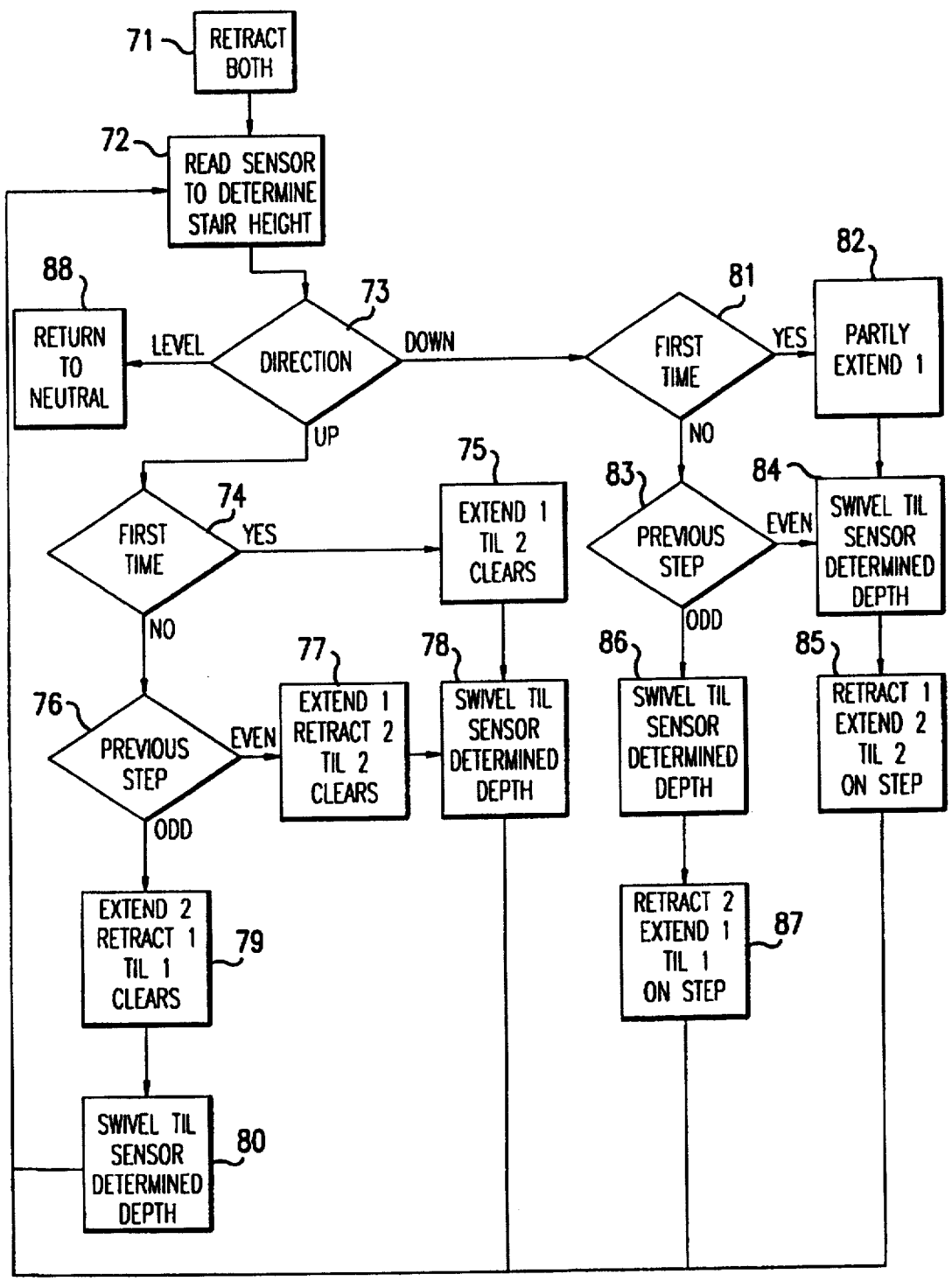
FIG. 8 illustrates the procedures utilized by the embodiment of FIG. 1 to ascend and descend stairs.

FIG. 8 shows one manner of stair climbing and stair descending with the embodiment of FIG. 1. In confronting a stair, initially both legs are retracted (shown in block 71), and then the height of the first step is measured (block 72). A determination is made whether stair ascent or descent is to occur (73). (At this point, it is helpful, to achieve stability, for the subject to hold an available handrail.)

Thereafter, in the first stage of stair ascent (shown in block 74), a first leg is extended until the second leg clears the step (75). The device then swivels until the second leg is over the step it has just cleared (78). (In implementing this stage, it is possible to use a sensor to determine how far to swivel based on the step depth. Alternatively, the swivel can be over a specified angle, such as 90 degrees.) The sensor is then checked to measure the height of the next step (72). If a step is determined to be present (73), and the previous step was odd (76), the process is continued by extending the second leg and retracting the first leg until the first leg clears the next step (79). Next, the device swivels until the first leg is over the cleared step (80). The sensor is then checked to measure the height of the next step (72). If a step is determined to be present (73), and the previous step was even (76), the process is continued by extending the first leg and retracting the second leg until the second leg clears the next step (78). The process is repeated beginning at block 72. If no step is detected, if the previous step was odd, it is completed by slightly extending the second leg, fully retracting the first leg, swiveling until both legs face forward, and then retracting the second leg to stand on both feet. If no step is detected, if the previous step was even, it is completed by slightly extending the first leg, fully retracting the second leg, swiveling until both legs face forward, and then retracting the first leg to stand on both feet (88).

An analogous procedure is followed for descending stairs. In the first stage of stair descent (shown in block 81), the first leg is slightly extended to clear the second leg (block 82). Thereafter, the device swivels until the second leg is over the step onto which it is going to descend (84), the first leg is retracted and the second leg is extended until the second leg is on the step (85). The sensor is then checked to measure the height of the next step (72). If a step is determined to be present (73), and the previous step was odd, the process is continued by swiveling until the first leg is over the step onto which it is going to extend (86). The second leg is then retracted and the first leg extended until the first leg is on the step (block 87). The sensor is then checked to measure the height of the next step (72). If a step is determined to be present (73), and the previous step was even, the process is continued (84), and then repeated beginning at block 72. If no step is detected, descent is completed by swiveling until both legs face forward, and then retracting both legs to stand on both feet (88).

In lieu of the swivel arrangement discussed above, in a further embodiment, relative motion of the legs may be achieved by causing each leg to be mounted in a manner as to permit it to slide in an approximately horizontal plane in the fore and aft directions. Alternatively, the legs may utilize joints analogous to knee and hip joints of human subjects.

Stair-Climbing with Clusters

Whereas the embodiment of FIG. 1 requires different ground-contacting members for stair-climbing and for level terrain navigation, the embodiments of the invention shown in FIGS. 9–21 successfully utilize the same set of ground-contacting members for both stair-climbing and for level terrain navigation. FIGS. 9–18 illustrate embodiments of the invention utilizing a pair of wheel clusters as the ground-contacting members in lieu of the pair of wheels used in the embodiment of FIG. 1.

Figure 9:
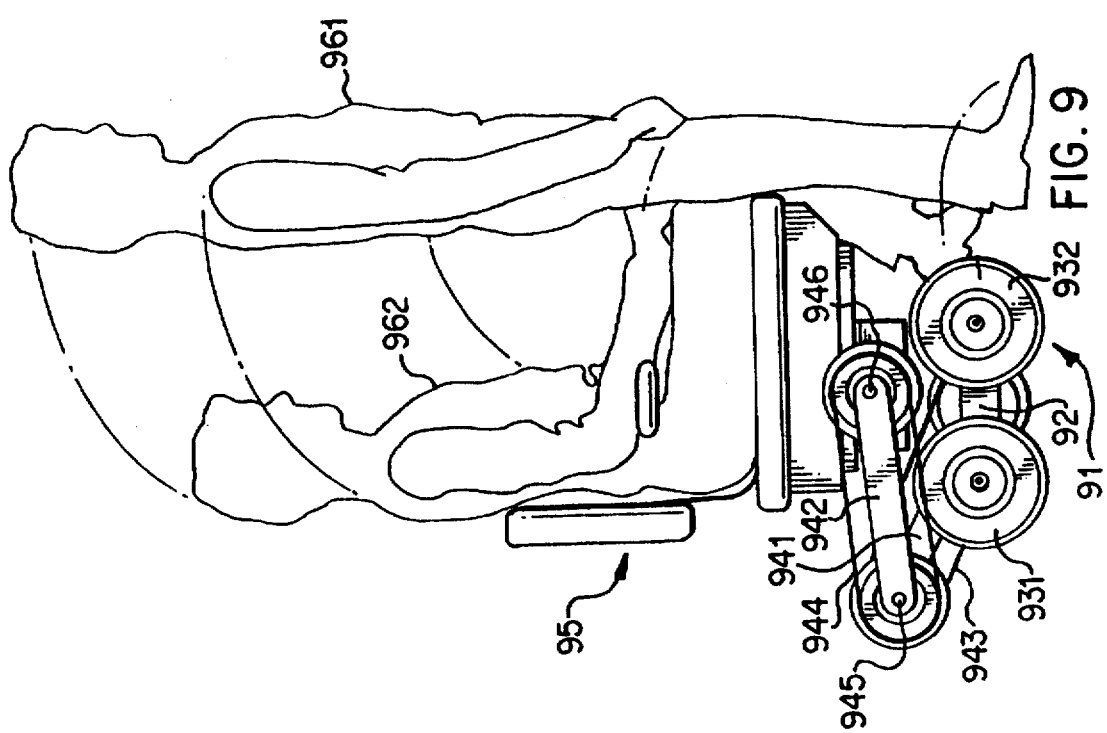

In FIG. 9, there is shown a side view of an embodiment utilizing a two-wheel cluster design. The subject 962 is shown supported on the seat 95 of this embodiment. In view is the right-hand cluster 91 with a pair of wheels 931 and 932 in radially symmetric locations about the cluster's axis 92 of rotation. A similar left-hand cluster is also employed. Each cluster has its own separately controlled motor to drive it about its axis of rotation 92. Each pair of wheels (here, 931 and 932) is also driven by a separately controlled motor about its own axis of rotation, but the wheels of a cluster are coupled to rotate synchronously.

It can be seen in FIG. 9 that the cluster 91 is positioned so that both wheels 931 and 932 may be in contact with the ground. When the cluster 91 (along with the left-hand cluster) is in this position, the transporter of this embodiment is relatively stable in the fore-aft plane, thereby permitting a subject 961 shown standing) to assume rapidly a comfortable seated position 962 on the device or, for example, a handicapped person to transfer from another chair.

Figure 10:
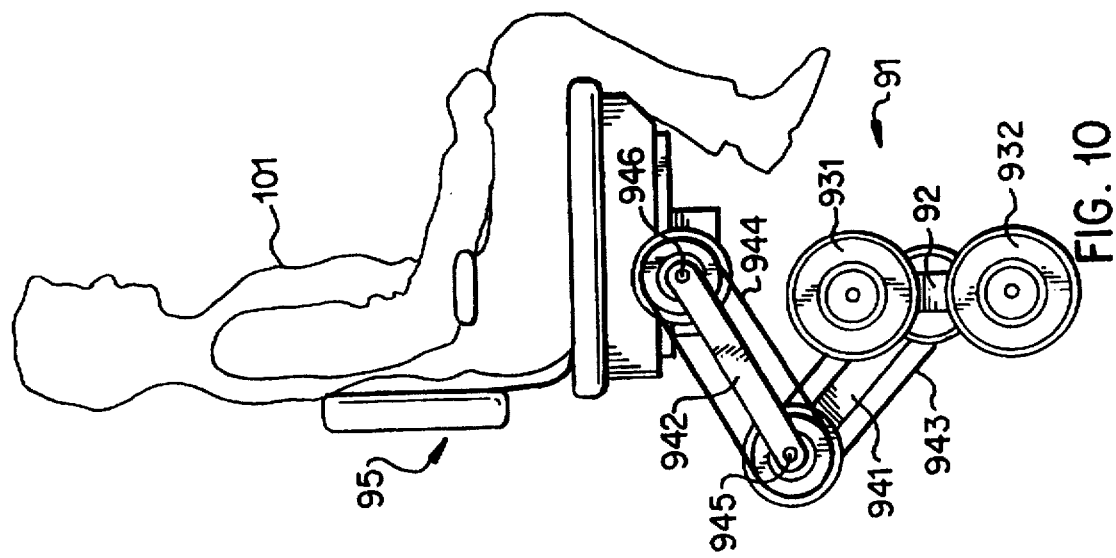

The cluster 91, however, may be rotated about its axis 92 until only wheel 932 of each cluster is in contact with the ground as shown in FIG. 10. When the cluster 91 (along with the left-hand cluster) is in this position, the transporter has the same inherent fore-aft instability as discussed above in connection with the embodiment of FIG. 1. The same equations governing the system may be used as discussed above in order to drive the wheels to create fore-aft stability dynamically. Also as shown in FIGS. 9 and 10, the chair 95 may be linked to the ground-contacting members via an articulated arm having segments 941 and 942 that may be adjusted in angle with respect to each other and the seat 95. The adjustments are achieved by motorized drives disposed at hubs 945 and 946. (Such drives may, for example, be harmonic drives.) As a result of these adjustments (in addition to the effect of rotating the clusters), the height of the seat 95, among other things, may be changed; it can be seen that the subject 101 may achieve a height while seated on the transporter comparable to (or even greater than) a standing subject 961. This is desirable, since subjects in ordinary wheel chairs are commonly dwarfed by standing subjects. As will be discussed in further detail below, the foregoing adjustments also permit adjustment of the fore-aft tilt of the seat.

Figure 11:
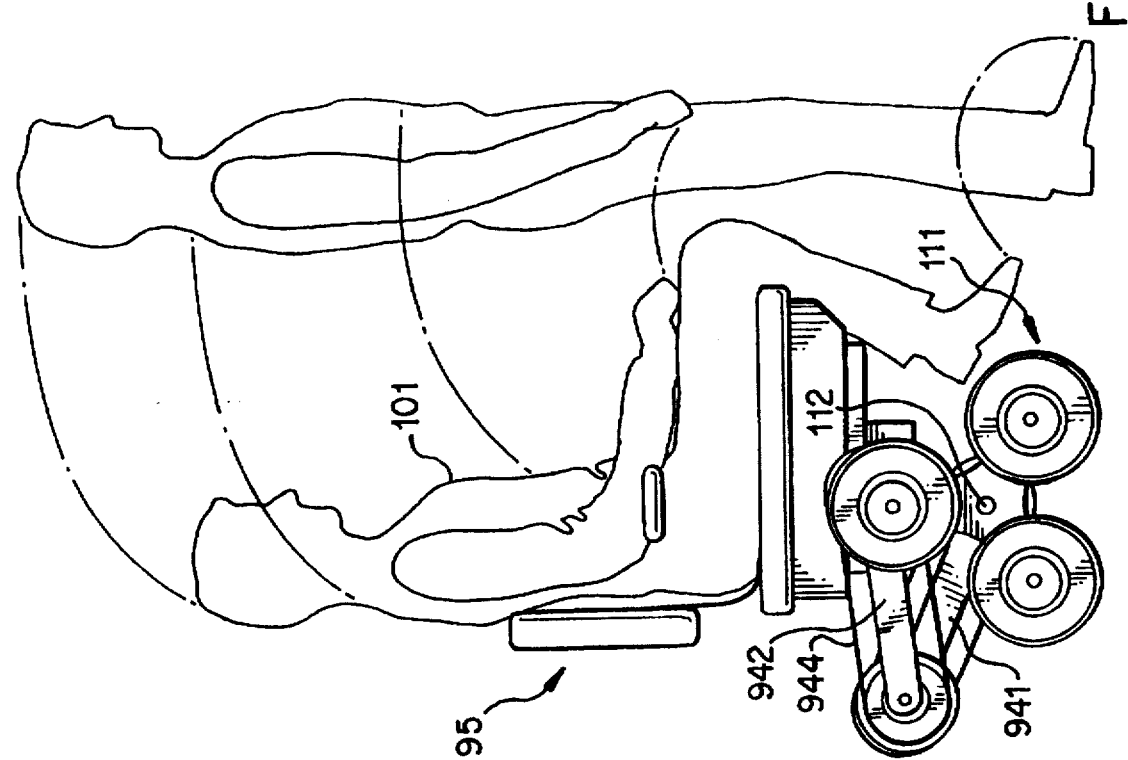

FIGS. 11-18 show use of a three-wheel cluster design in various modes and configurations. FIGS. 11 (showing stable rest position) and 12 (showing balancing position for travel) for three-wheel clusters correspond to FIGS. 9 and 10 for two-wheel clusters. Each three-wheel cluster (right-hand cluster 111 is shown here) is rotatably mounted and motor-driven about axis 112, using separately controllable motors. As in the case of the two-wheel cluster design, the wheels of each cluster are separately driven and controlled, but run synchronously in each cluster.

It should be noted that although many of the embodiments described herein utilize separate motors individually controlled, a common motor may be used for a number of functions, and the separate control may be achieved by appropriate clutch or other power transmission arrangement, such as a differential drive. The term "motorized drive" as used in this description and the following claims means any device that produces mechanical power regardless of means, and therefore includes a motor that is electric, hydraulic, pneumatic, or thermodynamic (the latter including an internal combustion or an external combustion engine) together with any appropriate arrangement for transmission of such mechanical power; or a thrust-producing device such as a turbojet engine or a motor-driven propeller.

Figure 12:
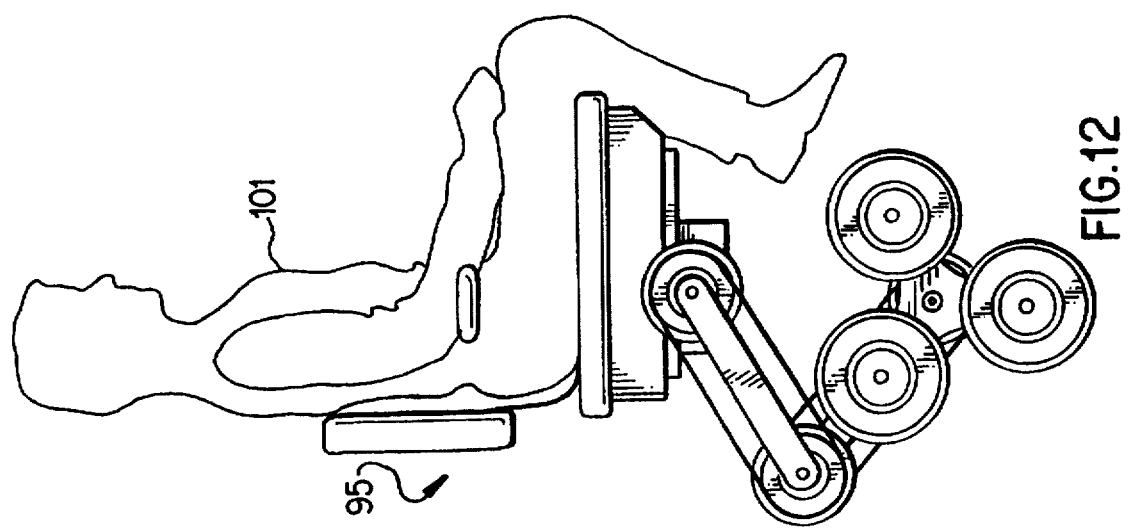
Figure 13:
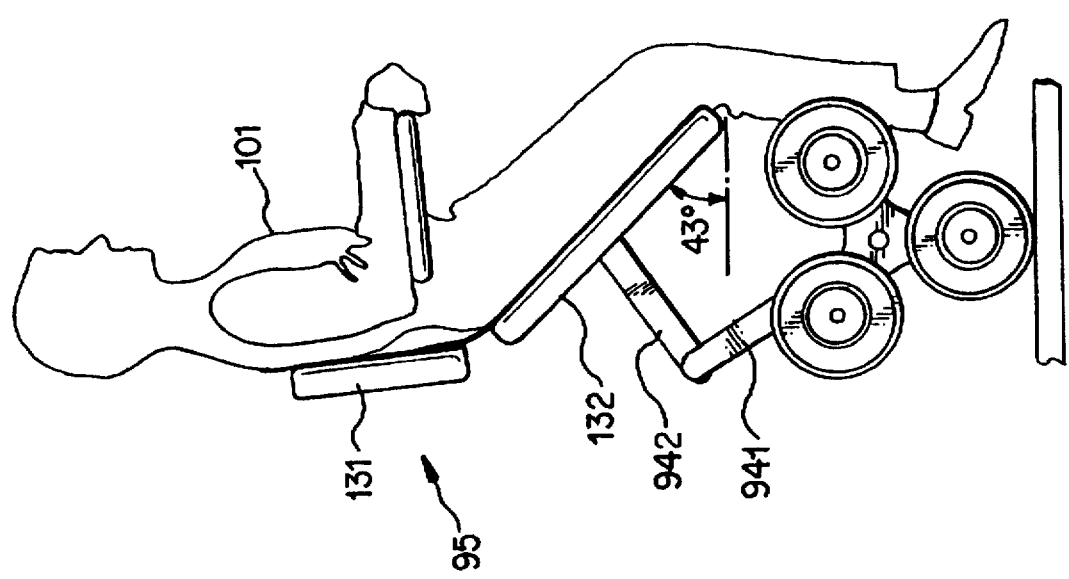

FIG. 13 is similar to FIG. 12, but here the chair 95 is shown having a back 131 and a seat 132. The angle of back 131 relative to the seat 132 and the angle of the seat 132 relative to the horizontal may be adjusted so that with the back 131 in a generally vertical orientation, the seat 132 may be tilted toward the vertical to permit the user to assume a more nearly standing position.

Figure 14:
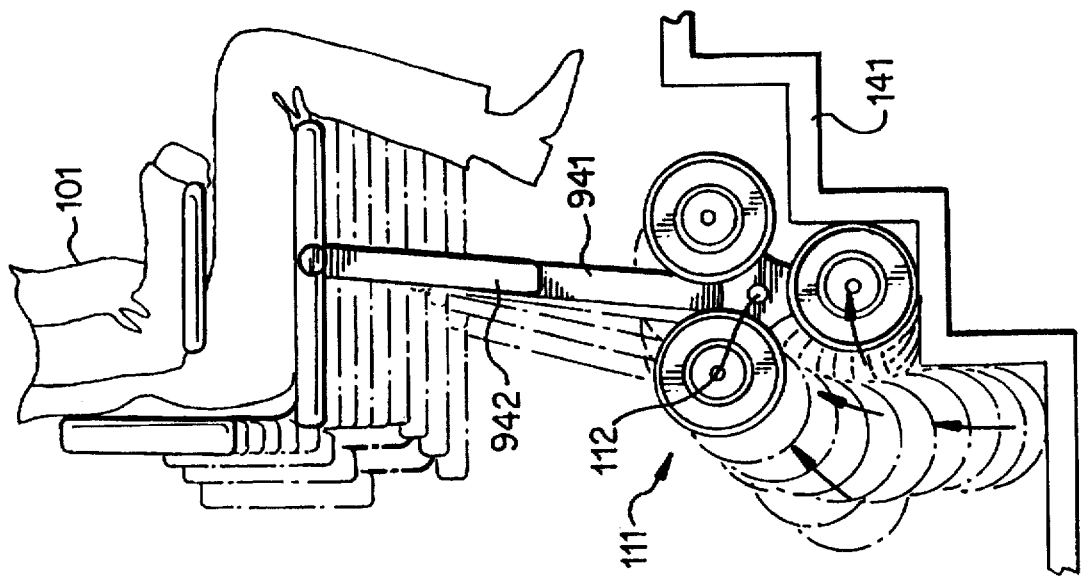

In FIG. 14, the embodiment is shown climbing stairs. The articulated arm segments 941 and 942 are here in the extended position to provide maximum height, so that the feet of the subject 101 to clear the stairs 141. Stair climbing is achieved by rotation of each of the right cluster 111 and left cluster (not shown) about central axis 112 and coordinated rotation of the wheels. The actual modes and control arrangements for achieving stair climbing are described below in connection with FIG. 27 et seq.

FIGS. 15–17 are views of an embodiment similar to that of FIGS. 11 and 12, but in which one of the segments 161 and 171 of the articulated arm, in this case segment 171, actually carries seat 151 of the body support combination comprising seat 151 and surround 152. Surround 152 is here provided with headrest 155. When the segment 171 is oriented in a near-vertical position, the seat 151 moves out of the way, permitting the subject 153 to assume a standing position supported by seat 151, surround 152, and footrest 154.

Figure 20:
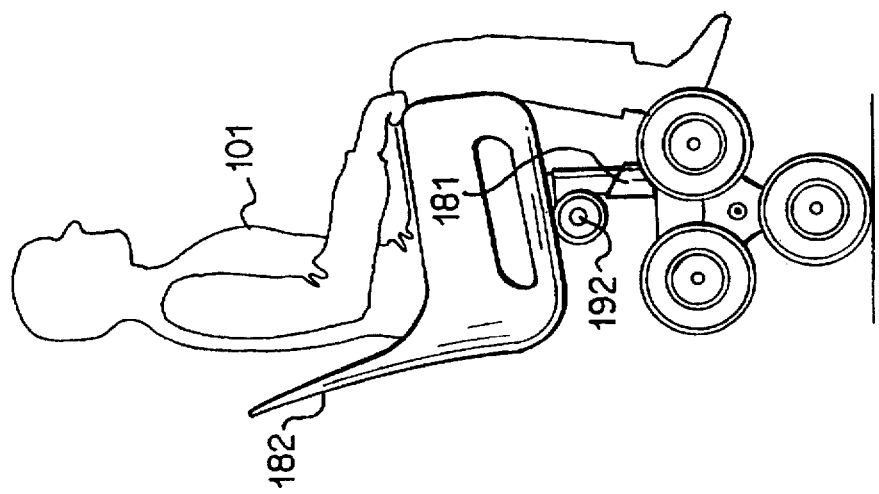
Figure 19:
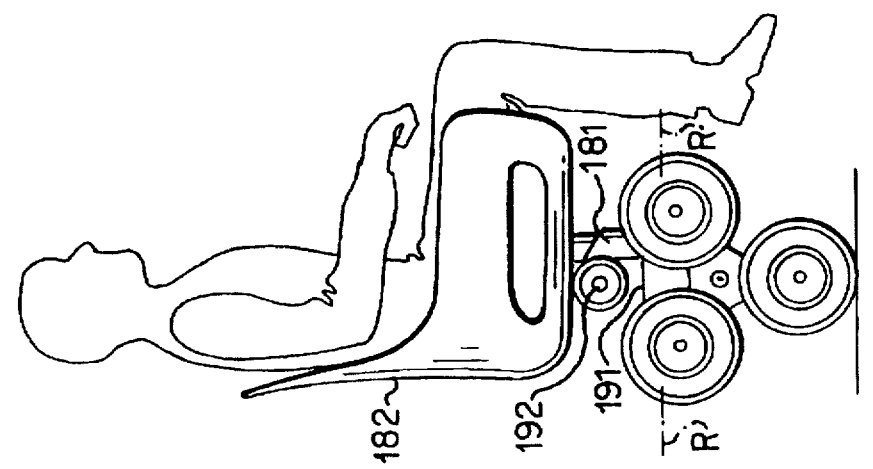
Figure 18:
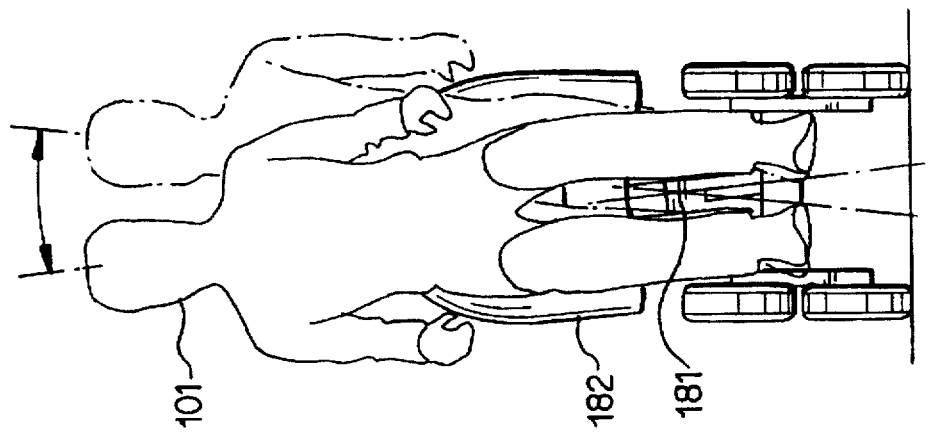

FIGS. 18–20 illustrate an embodiment, similar to that of FIGS. 11–14, in which the height of subject 101 can be adjusted by telescoping member 181, the extension of which is under separate motor control. In addition, the roll angle of the subject, about an axis R—R in FIG. 19, is adjustable as shown in FIG. 18, via separately controlled motor unit 191 of FIG. 19. Furthermore, the fore-aft tilt of chair 181, shown in two different positions in FIGS. 19 and 20, is adjustable via separately controlled motor unit 192. Although the roll and tilt adjustments are here implemented with a pivot and a motorized drive, each of these adjustments could also be implemented, for example, by a four-bar or other linkage arrangement coupled to a motorized drive.

Figure 21:
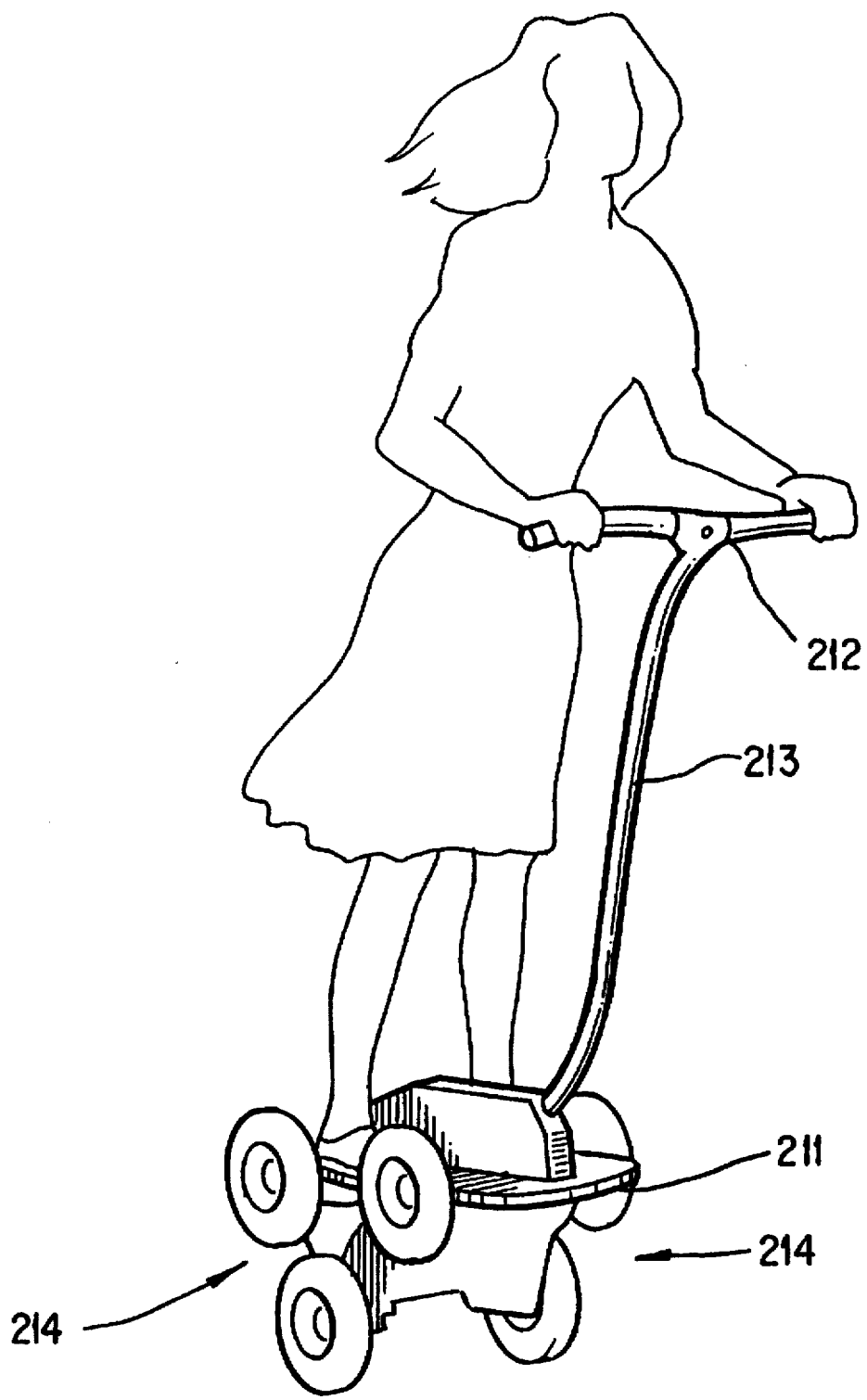

In FIG. 21, it can be seen that a transporter can be made in accordance with the present invention without providing a chair. The subject stands on a platform 211 and holds a grip 212 on handle 213 attached to the platform 211, so that the device of this embodiment may be operated in a manner analogous to a scooter. The grip 212 may be conveniently provided with a thumb-operated joystick for directional control, although other methods of control may also be used. For example, the handle 213 and grip 212 may be avoided altogether, and the platform 211 may be equipped with sensors to detect leaning of the subject. Indeed, as described in connection with FIG. 5 and as further described below, the pitch of the device is sensed and compensated for in the control loop, so that if the subject leans forward, the device will move forward to maintain vertical stability. Accordingly, a forward lean will cause forward movement; a backward lean will cause backward movement. Appropriate force transducers may be provided to sense leftward and rightward leaning and related controls provided to cause left and right turning as a result of the sensed leaning. The leaning may also be detected using proximity sensors. Similarly, the device of this embodiment may be equipped with a foot- (or force-) actuated switch to activate the device, in such a manner that the switch is closed so as to power the device automatically when the subject stands on the platform 211. Although this embodiment is shown with left and right wheel clusters 214 operated in the manner of the clusters of FIGS. 13–20, the transporter may be alternatively provided with other ground-contacting members, such as with a transversely disposed single pair of wheels in the manner of FIG. 1 (but without legs) or with left and right pairs of axially adjacent and rotatably mounted arcuate element pairs in a fashion similar to that of FIGS. 22–24 described below.

Stair-Climbing Using Arcuate Elements

Figure 22:
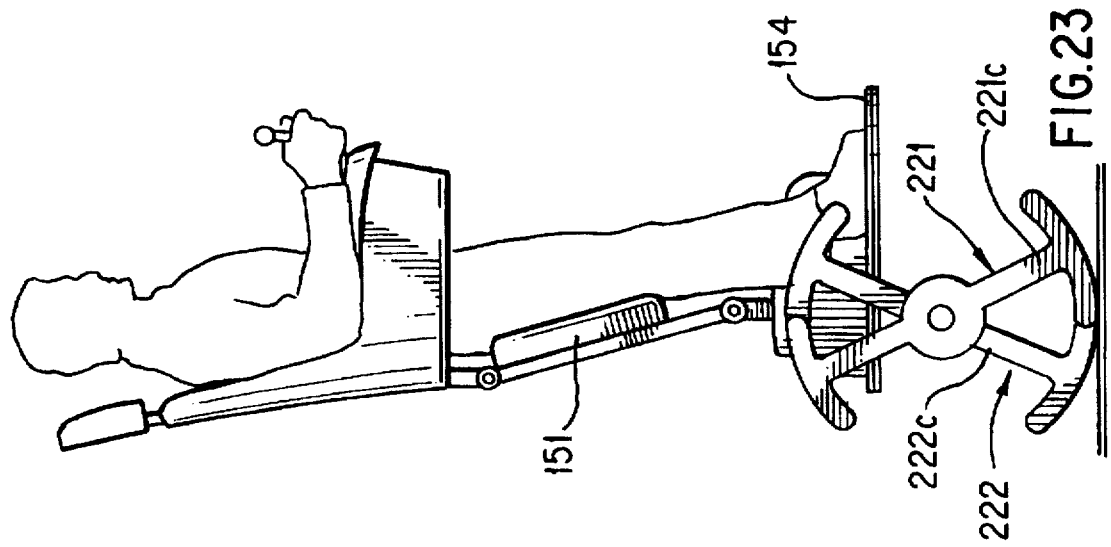
FIGS. 22–24 illustrate an embodiment wherein each ground-contacting member is realized as a plurality of axially adjacent and rotatably mounted arcuate element groups.
Figure 23:
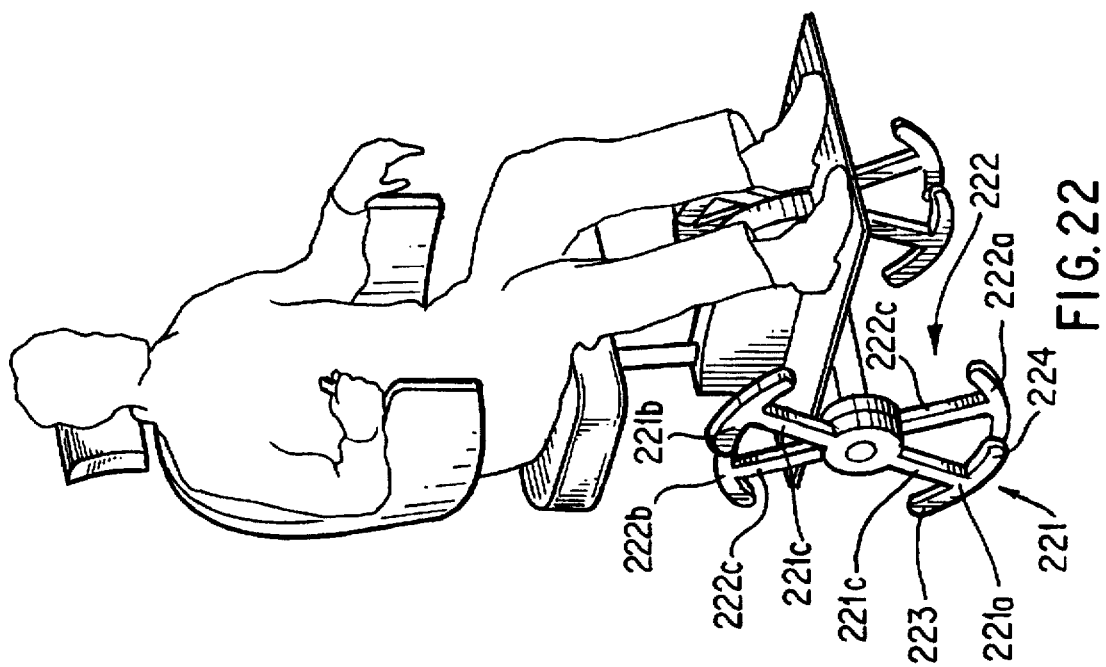
Figure 24:
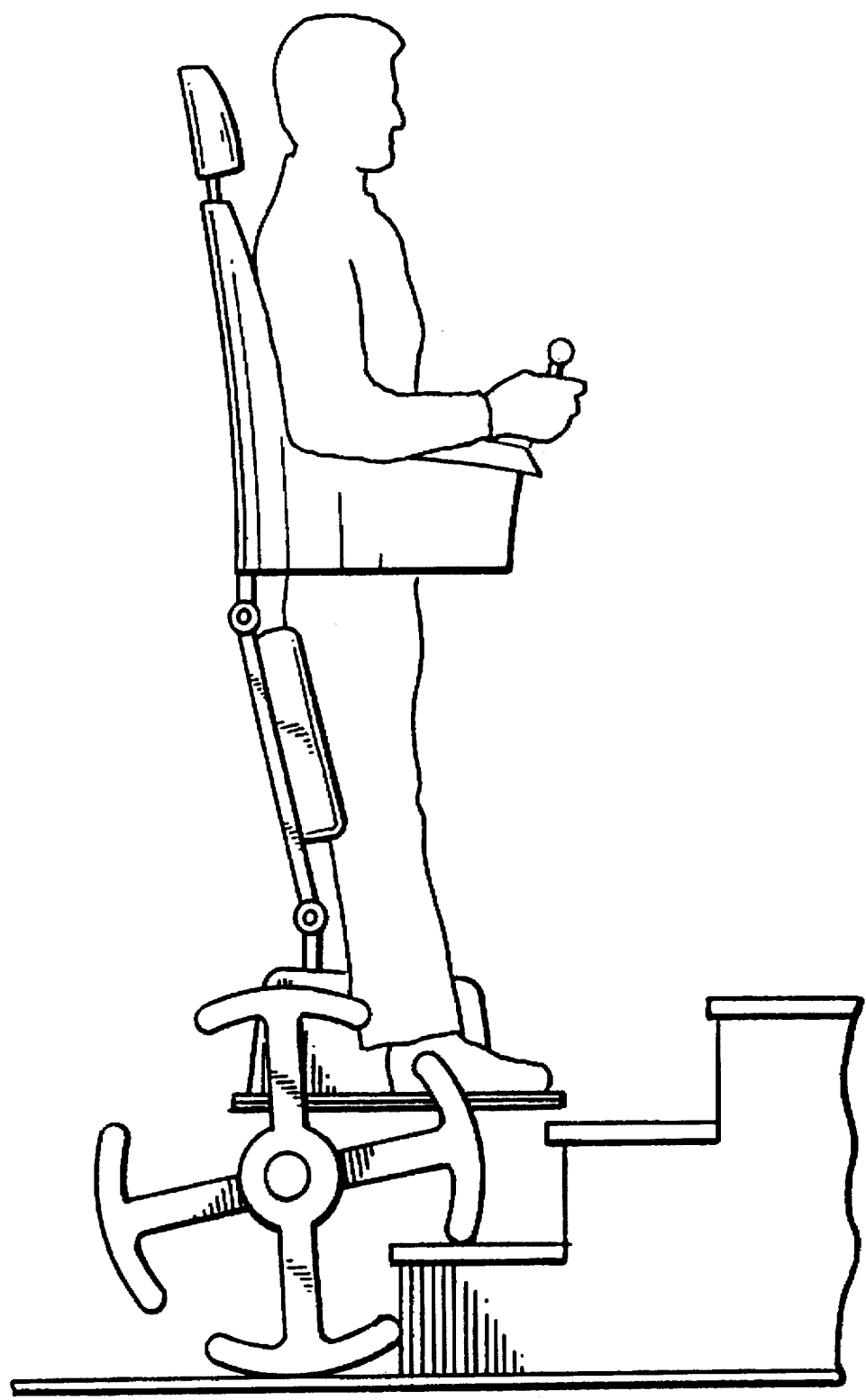

FIGS. 22–24 illustrate an embodiment wherein each ground-contacting member is realized as a plurality (here a pair) of axially adjacent, rotatably mounted arcuate element groups. For example, in FIG. 22, which corresponds generally to the cluster-propelled embodiment of FIG. 15, the right-hand ground-contacting member is realized as arcuate pair 221 and 222. The arcuate elements (items 221a–221b and items 222a–222b) of each pair 221 and 222 are transversely disposed at opposing ends of a support strut (items 221c and 222c respectively) that is rotatably mounted at its midpoint. Each support strut 221c and 222c is motor driven and is controllable independently of the other. In operation, during normal locomotion, the arcuate elements of each pair approximate action of a wheel. When, for example, during such locomotion, arcuate element 221a is about to lose contact with the ground, element 222a has been rotated so as to arrive at the position shown to permit the roll established by the shape of the arcuate elements to continue. In this fashion, there is a substantially continuous rolling motion of the device along the arcuate elements. Thus the motion of each of the arcuate elements about its axis of rotation is not generally at constant angular velocity. Typically each arcuate element pair moves at a greater angular rate when neither element of the pair is in contact with the ground. However, when one element of the pair is in contact with the ground, the angular velocity of the pair (and therefore of the ground-contacting element) is controlled to match the desired ground velocity of the device, so that constant ground velocity can be achieved when desired.

Preferably the radially outermost extent of each arcuate element has a generally constant main radius of curvature that conforms generally with that of a circle having a radius of length equal to the distance of that extent. Each arcuate element has a leading portion, which approaches the ground first in forward motion of the device, and a trailing portion, which leaves the ground last in forward motion of the device. The leading portion of arcuate element 221a, for example, is identified as item 223 and the trailing portion of arcuate element 221a is identified as item 224. To permit successive arcuate elements to contact the ground smoothly in the course of forward motion, it is preferable that the radius of curvature of each arcuate element near the tip of its leading portion should be somewhat smaller than such element's main radius of curvature. Similarly, to permit successive arcuate elements to contact the ground smoothly in the course of rearward motion, it is preferable that the radius of curvature of each arcuate element near the tip of its trailing portion should be somewhat smaller than such element's main radius of curvature. Alternatively, or in addition, the radius of curvature near the tips of the leading portion and trailing portion may adjusted in other ways to facilitate the transfer of load from one arcuate member of the group to the next. It may be desirable, for example, in some embodiments to cause the tip radius of curvature to be greater than the main radius of curvature. In other embodiments, the tip may be deflectably mounted and is coupled to a deflection arrangement, so that on actuation the local radius of curvature may be modified.

It should be noted that, when desired, the device of this embodiment may be placed in a rest position, by scissoring struts 221c and 222c to such an angle (approaching π radians) that the leading portion of one arcuate element is in contact with the ground, the trailing portion of another arcuate element is in contact with the ground, and the points of contact are spaced apart from one another. Such a position also reduces the overall height of the device and facilitates compact storage or transport of the device.

In FIG. 23, which corresponds generally to the cluster-propelled embodiment of FIG. 17, the device of FIG. 22 is shown with the subject standing on platform 154 with the seat 151 oriented vertically.

In FIG. 24, the embodiment of FIG. 22 is shown climbing stairs. The struts are moved in such a way that successive arcuate elements land on successive stairs.

Details of Cluster Implementation

Figure 25:
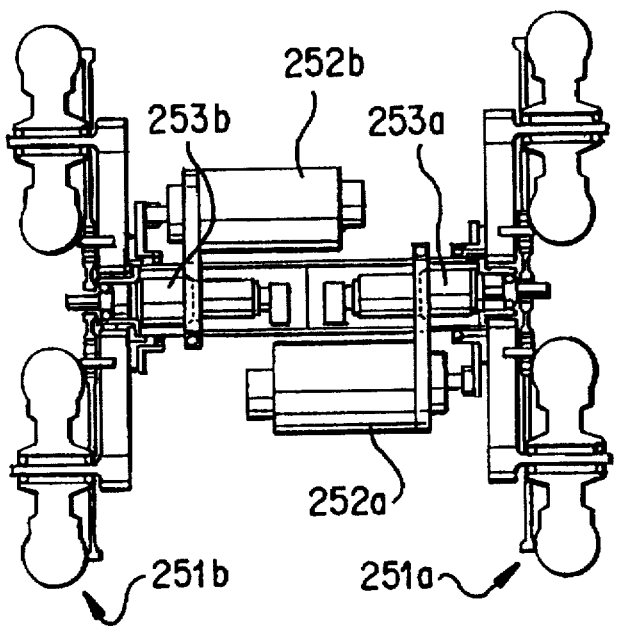
FIGS. 25–26 provide mechanical detail of a three-wheel cluster design for use in the embodiment of FIGS. 18–20.
Figure 26:
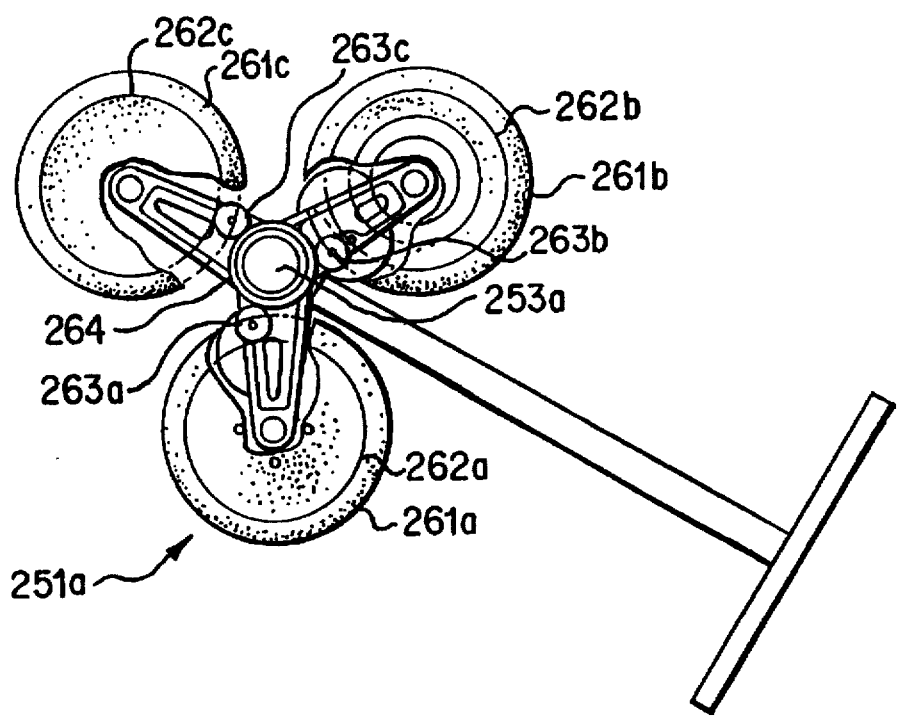

FIGS. 25–26 provide detail of a three-wheel cluster design for the embodiment of FIGS. 18–20. Each cluster 251a and 251b has its own drive motor 252a and 252b, which drives the cluster through a gear train. The wheels of each cluster are powered separately by a motor 253a for cluster 251a and by a motor 253b for cluster 251b. The wheels within a given cluster 251a or 251b are driven synchronously by such cluster's motor 253a or 253b, as the case may be, through a radially disposed gear arrangement. A side view of the cluster 251a in FIG. 26 shows wheels 261a, 261b, and 261c with associated drive gears 262a, 262b, and 262c, driven by respective idler gears 263a, 263b, and 263c, which in turn are driven by power gear 264, which is turned by the shaft of motor 253a.

Figure 27:
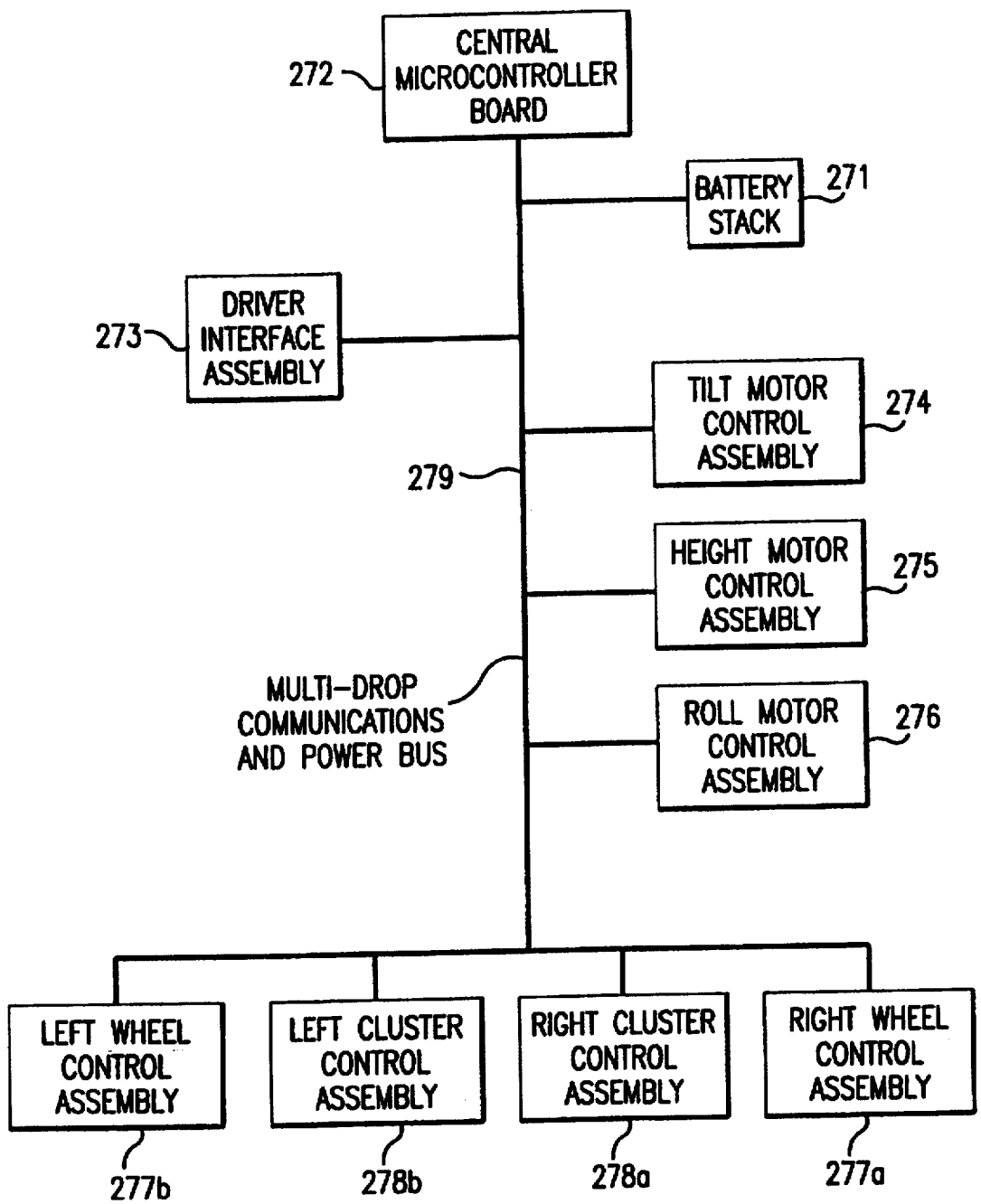
FIG. 27 is a block diagram showing communication among the control assemblies used in the embodiment of FIGS. 18–20.

FIG. 27 is a block diagram showing communication among the control assemblies used in a device according to the embodiment of FIGS. 18–20. A similar set of assemblies may be used for any of the other embodiments described herein. The device is powered by battery stack 271. Bus 279 provides communications (here implemented serially) among and power to the various assemblies. Overall system control of the device is provided by central microcontroller board 272. Inputs, derived from sources such as the joystick and inclinometer, to the central microcontroller board 272 that establish the basis for system control are provided by the driver interface assembly 273, which is described below in connection with FIG. 29. The tilt, height, and roll of the chair 182 of FIG. 18 are adjusted by tilt motor control assembly 274, height motor control assembly 275, and roll motor control assembly 276 respectively. Rotation of the right and left clusters is controlled by right cluster control assembly 278a and left cluster control assembly 278b respectively. Rotation of the wheels in the right cluster and in the left cluster is controlled by right wheel control assembly 277a and left wheel control assembly 277b.

Figure 28:
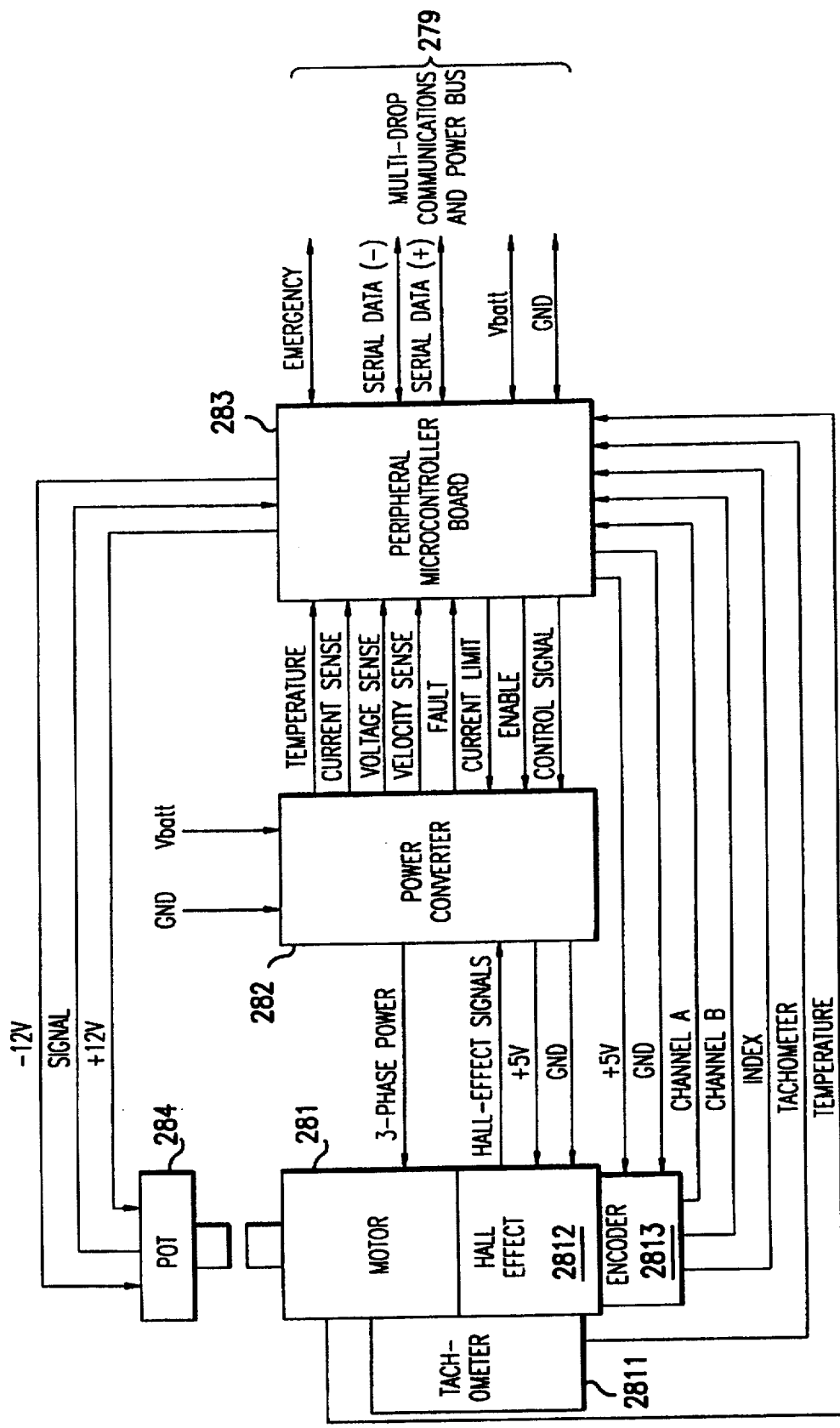
FIG. 28 is a block diagram showing the structure of a generic control assembly of the type used in the embodiment of FIG. 27.

The general structure of each of the control assemblies, identified in FIG. 27, used for the chair position and wheels and clusters is shown in FIG. 28. A motor 281 receives 3-phase power from power converter 282. Output from Hall effect detector 2812 provides information signals to the power converter 282 to control the phase of power to the motor. Information signals relating to the shaft rotation of the motor or of the position of mechanical systems powered by the motor may be provided by one or more of potentiometer 284, tachometer 2811, or incremental encoder 2813. (Alternatively, the Hall effect detector 2812 may itself be utilized.) These signals are fed to peripheral microcontroller board 283. Additionally temperature outputs associated with power converter 282 and motor 281 provide input signals to the peripheral microcontroller board 283. The peripheral microcontroller board 283 is in turn in communication with the central microcontroller board 272 over bus 279.

Figure 29:
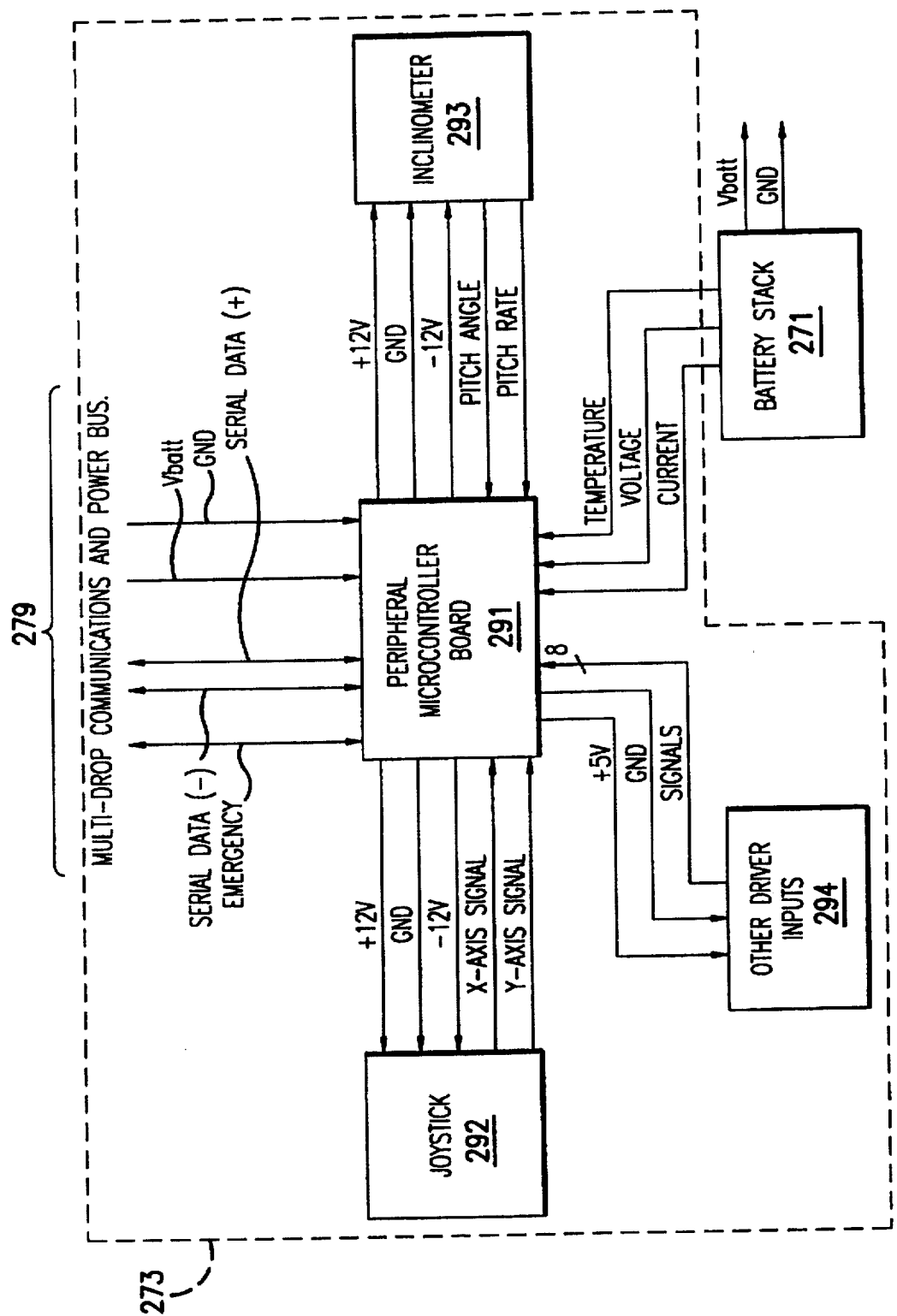
FIG. 29 is a block diagram providing detail of the driver interface assembly 273 of FIG. 27.

FIG. 29 is a block diagram providing detail of the driver interface assembly 273 of FIG. 27. A peripheral microcomputer board 291 receives an input from joystick 292 as well as from inclinometer 293. The inclinometer provides information signals as to pitch and pitch rate. To permit controlled banking into turns by the device (thereby to increase stability while turning) it is also feasible to utilize a second inclinometer to provide information as to roll and roll rate or, alternatively, the resultant of system weight and centrifugal force. Other inputs 294 may also be desirably provided as an input to the peripheral microcontroller board 291. Such other inputs may include signals gated by switches (knobs and buttons) for chair adjustment and for determining the mode of operation (such as lean mode or balance mode described below). The peripheral microcontroller board 291 also has inputs for receiving signals from the battery stack 271 as to battery voltage, battery current, and battery temperature. The peripheral microcontroller board 291 is in communication over bus 279 with the central microcontroller board 272.

Figure 30:
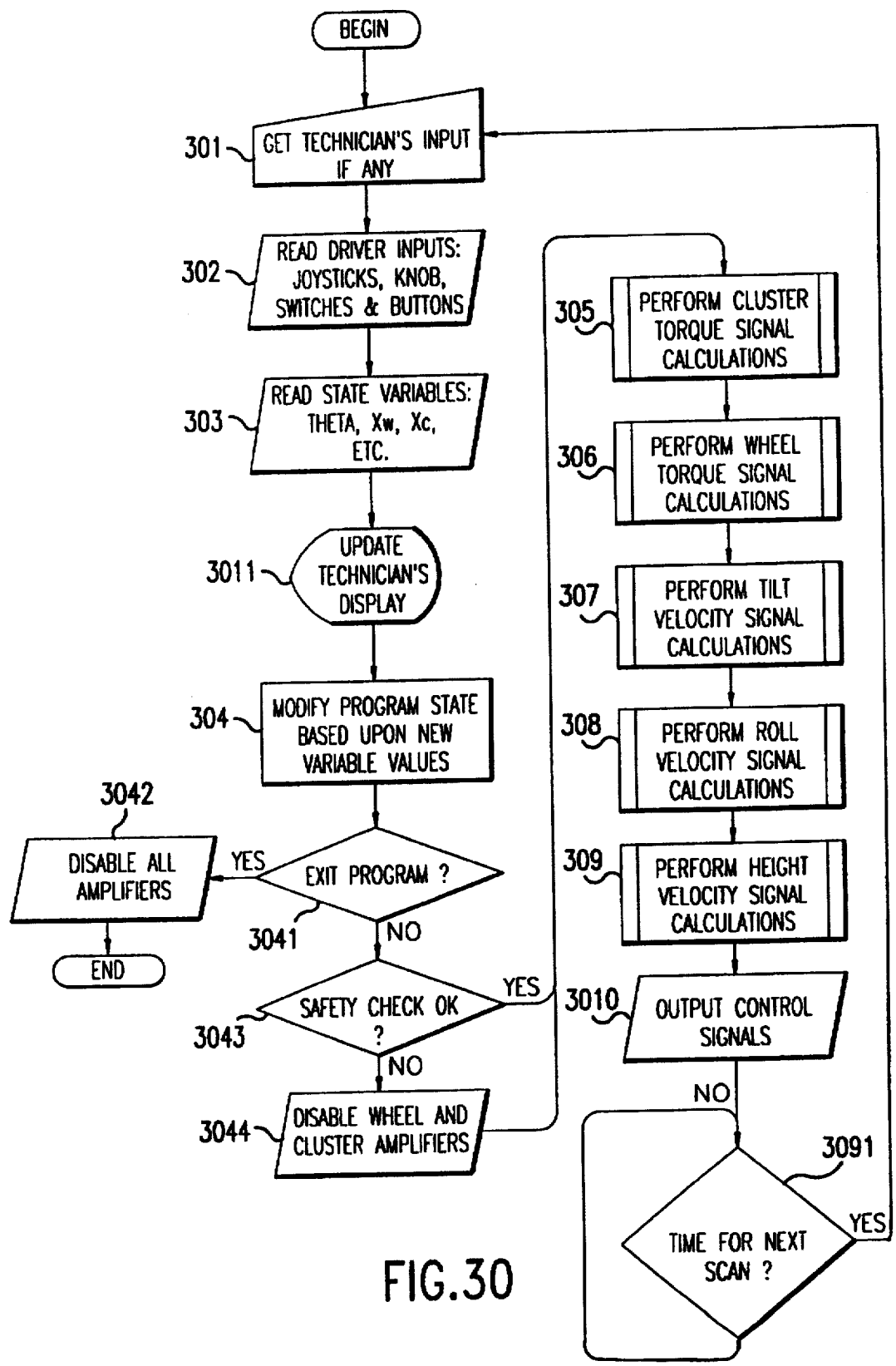
FIG. 30 is a logical flow diagram followed by the central microcontroller board 272 of FIG. 27 in the course of one control cycle.

FIG. 30 is a logical flow diagram followed by the central microcontroller board 272 of FIG. 27 in the course of one control cycle. For diagnostic purposes, the cycle begins at step 301, checking for the presence of any input from the technician. The next step, 302, is to read the driver's inputs from the joystick, switches, knobs, and buttons. Next, in step 303, the state variables of the device are read as inputs. Next, in step 3011, the technician's display is updated (in case of diagnostic use), and then, in step 304, the program state is modified based upon the input variables obtained in steps 301 through 303. A test is then made whether to exit the program (step 3041), and if the determination is yes, all of the motor amplifiers are disabled (step 3042), and the program is ended. Otherwise, a safety check is made (in step 3043) of pertinent variables (such as temperature, battery voltage, etc., and if the result is negative, the wheel and cluster motor amplifiers are disabled (step 3044), and the program state is then modified (step 3055). However, several levels of ckecking are suitably employed so that the motor amplifiers are disabled only after threshhold alarm conditioners have been established. If the safety check in step 3043 is positive or after the program state is modified in step 3055, calculations are performed seriatim for the cluster torque signal (step 305), wheel torque signal (step 306), tilt velocity signal (step 307), roll velocity signal (step 308), and height velocity signal (step 309). The results of these calculations are then provided as an output to their respective devices in step 3010. Under step 3091, the program waits for the next timing signal to begin the control cycle again. The frequency of the control cycles in this embodiment is in the range of 200–400 Hz., which provides satisfactory control responsiveness and stability.

Figure 31:
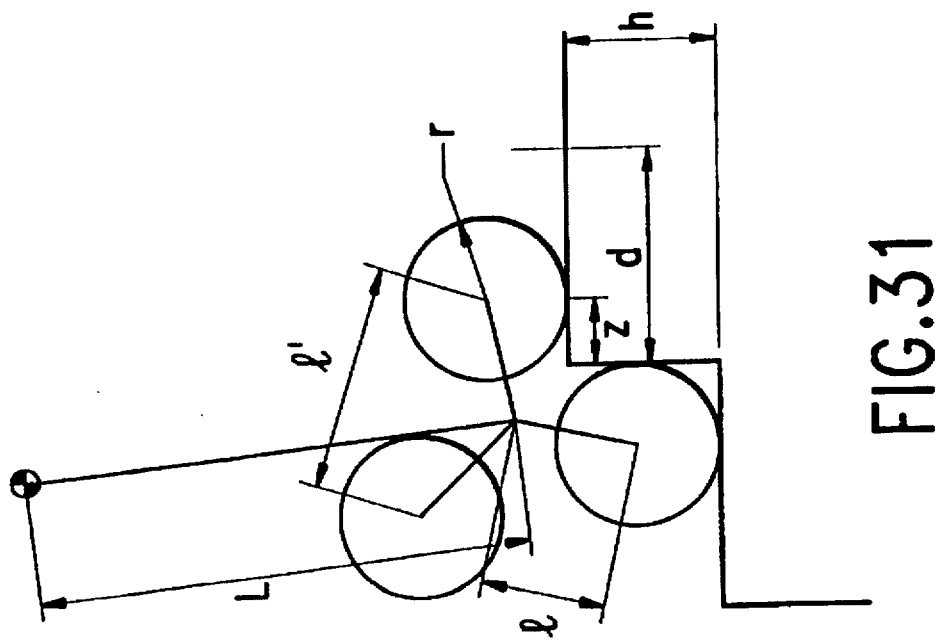
FIG. 31 illustrates variables defining the dimensions of the cluster design of FIGS. 11–26 and of a hypothetical stair with respect to which the cluster design will be used for ascent or descent.

FIG. 31 illustrates variables defining the dimensions of the cluster design of FIGS. 11–26 and of a hypothetical stair with respect to which the cluster design can be used for ascent or descent. Set forth in the following table are variables used to identify these dimensions shown in FIG. 31. "Nominal size" means typical dimensions of these items, in connection with which the embodiment of FIGS. 18–20 has been implemented and functions.

TABLE 1

Dimension Variables

| Variable | Description | Nominal Size |
|---|---|---|
| L | Distance from cluster center to center of mass of system | 21.0" |
| l | Distance from cluster center to wheel center | 5.581" |
| l' | Distance from wheel center to wheel center | 9.667" |
| d | Depth of stair | 10.9" |
| h | Height of stair | 6.85" |
| z | Distance between the edge of the riser and the wheel contact point when four wheels are in contact with the stairs and the lower wheels are against the riser. This can be calculated using $z = (l'^2 - h^2)^{1/2} - r$. | 3.011" |
| r | Radius of the wheel | 3.81" |

The following conventions have been employed in using these variables and those in Table 2 below in connection with the description below:

1. Variables defined in world coordinates are named using a single subscript in capital letters. World coordinates are coordinates fixed to the earth (inertial).

2. Variables defined in relative coordinates are named with a dual subscript. The subscripts indicate the endpoints of the variable. The order of the subscripts indicates the sign of the variable. For example, $\theta_{PC}$ is the angle between the post and the cluster leg where clockwise rotation from the cluster post is positive (see note 4). A cluster's "leg" is the line segment from the center of the cluster to the center of the wheel that is currently being balanced on. A cluster's "post" is the line segment from the system's center of mass to the center of the cluster.

3. Lower case subscripts are used to indicate other attributes, e.g., right/left, etc.: r=right; l=left; ref =reference; f=finish; s=start.

4. All angles are positive in the clockwise direction, where positive travel is in the positive x direction.

5. A dot over a variable indicates differentiation in time, e.g., $\dot\theta$.

Figure 32:
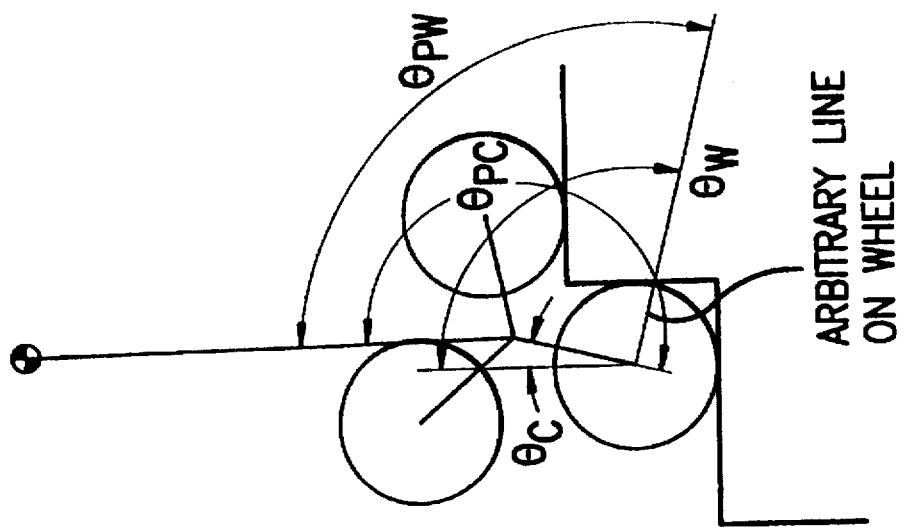
FIG. 32 illustrates angle variables pertinent to defining orientation of the cluster in relation to the device and to the world.

FIG. 32 illustrates angle and motion variables pertinent to defining orientation of the cluster in relation to the device and to the world. These variables are defined as set forth in the following table.

TABLE 2

Angle and Motion Variables.

| Variable | Name | Description |
|---|---|---|
| $\theta_C$ | Theta Cluster | The angle between vertical and the line from the wheel that is currently being balanced on to the cluster hub. |
| $\theta_W$ | Theta Wheel | The angle between vertical and an arbitrary radial line on the wheel. |
| $\theta_{PC}$ | Theta Post-Cluster | The angle centered at the cluster hub that starts at the post and ends at the leg being balanced on. ($\theta_{PC} = 180°$ when balanced on one wheel with the leg vertical.) |
| $\theta_{PW}$ | Theta Post-Wheel | The angle between the post and the arbitrary line on the wheel. |
| x | x | The linear position of the wheel center along the floor in reference coordinates. |
| $\theta_I$ | Theta Inclinometer | The angle of the inclinometer with respect to gravity. |
| $\theta$ | Theta (Pitch Angle) | The actual angle between center of mass |

TABLE 2-continued

Angle and Motion Variables.

| Variable | Name | Description |
|---|---|---|
| | | of the transporter and the wheel center. This is derived by compensating inclinometer angle $\theta_I$ for $\theta_C$ and $\theta_{PC}$. |
| ψ | Yaw Angle | The angle between the X axis of the device and the x-axis of the reference frame. |

Figure 33:
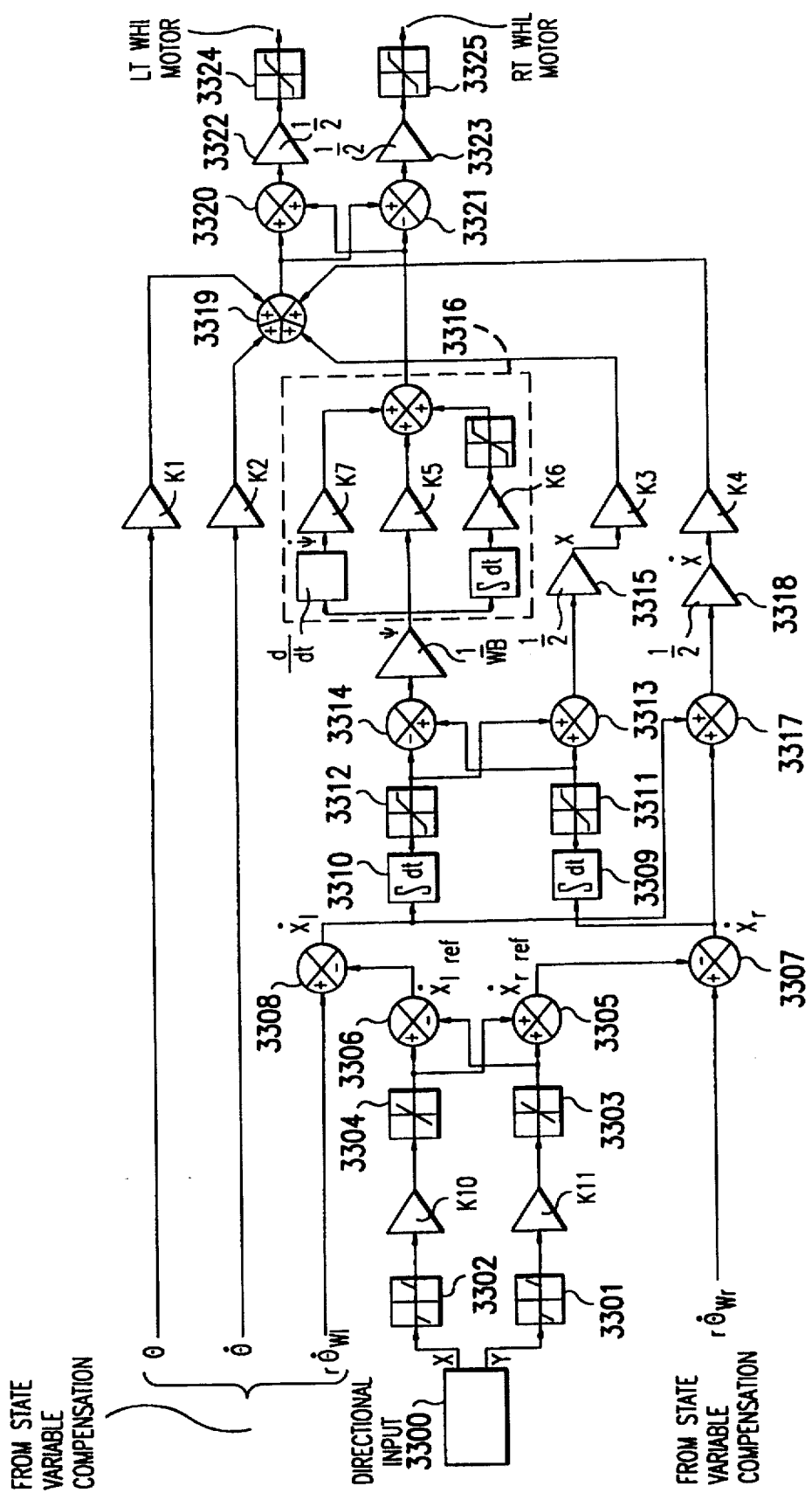
FIG. 33 is a schematic of the wheel motor control during balancing and normal locomotion.
Figure 34:
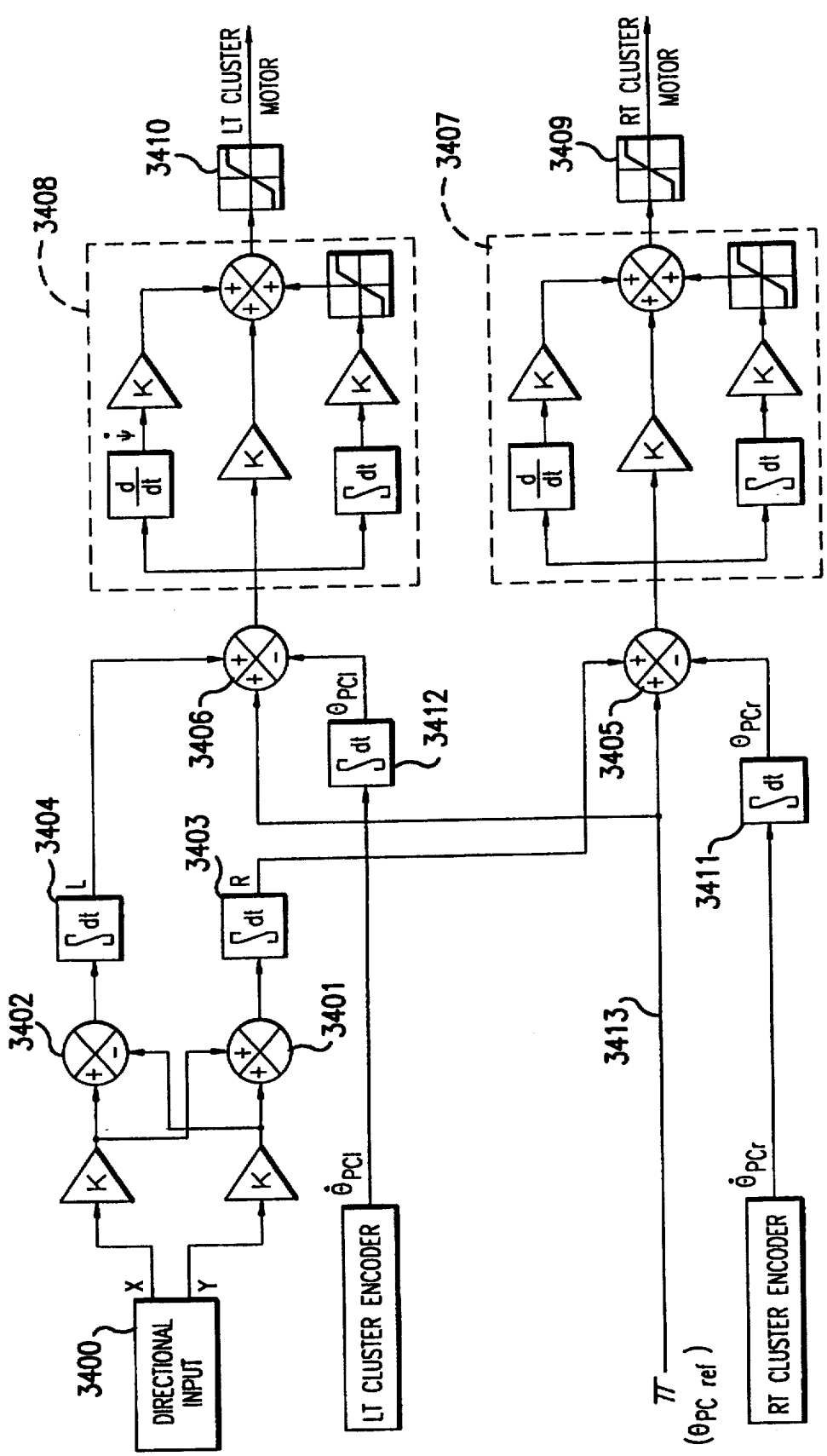
FIG. 34 is a schematic of the cluster control arrangement during balancing and normal locomotion.
Figure 35:
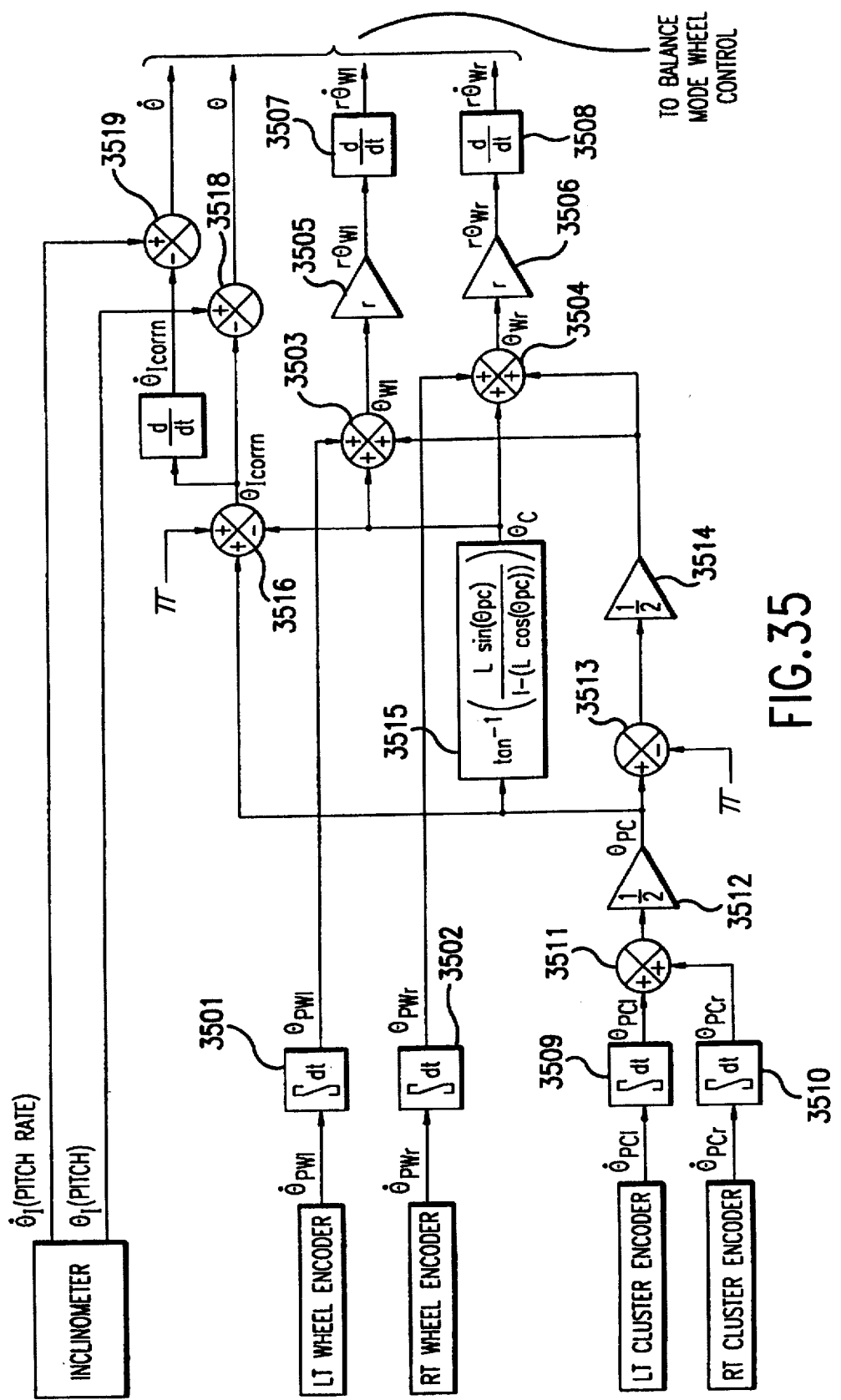
FIG. 35 is a schematic, relating to FIG. 33, showing the arrangement by which the state variables indicating wheel position are determined so as to compensate for the effects of cluster rotation.

FIGS. 33–35 are block diagrams showing control algorithms, suitable for use in conjunction with the control assemblies of FIG. 27, to provide stability for a device according to the embodiment of FIGS. 11–21 when balanced on a pair of wheels, both during locomotion and in a fixed position.

FIG. 33 shows the control arrangement for the motors of the right and left wheels (corresponding to items 252a and 252b of FIG. 25). The arrangement has inputs of (linear velocity of the left wheel relative to the world coordinate system) and $r\dot{\theta}_{wr}$ (linear velocity of the right wheel), in addition to directional inputs 3300 determined by joystick position along X and Y axes of a reference coordinate system. Inputs $\theta$, $\dot{\theta}$, and error signals x and (described below), subject to gains K1, K2, K3, and K4 respectively, become inputs to summer 3319, which produces the basic balancing torque command for the wheels, in the general manner described above in connection with FIG. 6 above. The output of summer 3319 is combined with the output of yaw PID loop 3316 (described below) in summer 3320, then divided in divider 3322 and limited in saturation limiter 3324, to produce the left wheel torque command. Similarly, the output of summer 3319 is combined with the output of PID loop 3316 in summer 3321, then divided in divider 3323 and limited in saturation limiter 3325, to produce the right wheel torque command.

In FIG. 33, a directional input along the X axis moves the reference coordinate system along its X axis relative to the world coordinate system (which represents the travelled surface), at a velocity proportional to the displacement of the joystick. A directional input along the Y axis rotates the reference coordinate system about its Z axis at an angular velocity proportional to the displacement of the joystick. It will be appreciated that motion of the joystick in the positive X direction is here interpreted to mean forward motion; motion of the joystick in the negative X direction means reverse motion. Similarly, motion of the joystick in the positive Y direction means leftward turning, counterclockwise as viewed from above; motion of the joystick in the negative Y direction means rightward turning clockwise as viewed from above. Hence the directional inputs Y and X are given deadband via deadband blocks 3301 and 3302 respectively, to widen the neutral position of the joystick, then subject to gains K11 and K10, then rate-limited by limiters 3303 and 3304 respectively, which limit the angular and linear accelerations respectively of the reference coordinate system. The sum of these outputs achieved through summer 3305 becomes the reference velocity $\dot{x}_{r\,ref}$ whereas the difference of these outputs achieved through summer 3306 becomes the reference velocity These reference velocities are subtracted in summers 3308 and 3307 from compensated linear velocity input signals and $r\dot{\theta}_{wr}$ for left and right wheels (see description below in connection with FIG. 35 for these quantities) to obtain velocity error signals $\dot{x}$ and $\dot{x}_r$ for left and right wheels within the reference coordinate system. In turn the average of these signals, determined via summer 3317 and divider 3318, produces a linear velocity error signal Displacement error signal x is derived by integrating and $r\dot{\theta}_{wr}$ in integrators 3310 and 3309, limiting the results in saturation limiters 3312 and 3311, and then averaging their outputs via summer 3313 and divider 3315. The difference between these displacements, determined via summer 3314, produces the yaw error signal ψ.

The yaw error signal x is run through a standard proportional-plus-integral-plus-derivative (PID) control loop 3316, the output of which is combined with the output of the basic balancing torque command of summer 3319, to produce the individual wheel torque commands, which cause the wheels to maintain fore-aft stability and also cause the transporter to align itself with the axes of, and follow the origin of, the reference coordinate system as directed by directional input 3300.

FIG. 34 is a schematic of the cluster control arrangement. The orientation of the clusters can be controlled by directional inputs 3400. If desired, the same joystick as used to provide directional inputs 3300 to the wheels may be switched, by a separate switch, to be operative, in a separate mode, to provide the directional inputs 3400 specifying the orientation of the clusters. In a fashion generally analogous to the signal path through summers 3306 and 3305 of FIG. 33, here the joystick signals resulting from positive displacement in the X direction are added, and signals resulting from positive displacement in the Y direction are subtracted from one another, in summers 3402 and 3401 to provide left and right cluster rotation rate signals, which, after integration in integrators 3404 and 3403 respectively, provide desired cluster angle orientation information to left and right cluster summers 3406 and 3405 respectively.

Absent directional inputs 3400, the preferred cluster orientation, normally $\theta_{PCref}=\Pi$ radians, is provided over line 3413 of FIG. 34 to each of the summers 3406 and 3405, along with signals showing actual cluster orientation $\theta_{PCl}$ and $\theta_{PCr}$ (derived by passing cluster angle rate signals from left and right cluster encoders through integrators 3412 and 3411 respectively). The outputs of the summers 3406 and 3405 are therefore cluster position error signals for the left and right clusters respectively. These signals are fed through PID control loops 3408 and 3407 and saturation limiters 3410 and 3409 to drive the left and right cluster motors.

FIG. 35 is a schematic, relating to FIG. 33, showing the arrangement by which the state variables indicating wheel position, pitch, and pitch rate are determined so as to compensate for the effects of cluster rotation. As mentioned in Table 2, the pitch angle $\theta$ is the actual angle between the center of mass of the transporter and the center of the wheel that is currently being balanced on. The angle $\theta_I$ measured by the inclinometer is the angle of the post with respect to the vertical. Hence the actual pitch angle $\theta$ is based on $\theta_I$ from which a correction signal $\theta_{I\,corr}$ is subtracted by summer 3518. The signal $\theta_{I\,corr}$ is calculated in summer 3516 as $\theta_{PC}+\Pi\theta_C$. The signal $\theta_{PC}$ is determined as the average of the left and right post-to-cluster angles $\theta_{PCl}$ and $\theta_{PCr}$ obtained from integration in integrators 3509 and 3510 of left and right cluster encoder outputs; the average is obtained by using summer 3511 and divider 3512. Assuming that the transporter is balanced, $\theta_C$ can be derived from $\theta_{PC}$ using the formula $$\theta_c = \tan^{-1}\left(\frac{L\sin\theta_{PC}}{T - L\cos\theta_{PC}}\right).$$

This calculation is achieved in section 3515. The $\theta_{Icorr}$ is differentiated by differentiator 3517 to provide a correction to pitch rate signal $\dot{\theta}$, which is supplied by summer 3519, yielding the corrected output $\dot{\theta}$.

Similarly, the linear left and right velocities $r\dot{\theta}_{wl}$ and $r\dot{\theta}_{wr}$ for left and right wheels are derived from differentiation by differentiators 3507 and 3508 of the derived linear left and right position signals $r\theta_{wl}$ and $r\theta_{wr}$. The position signals, in turn, are derived by multiplying by a gain of r in multipliers 3505 and 3504 the determined absolute angular positions $\theta_{wl}$ and $\theta_{wr}$ of the left and right wheels. The angular positions $\theta_{wl}$ and $\theta_{wr}$ are determined by first integrating the left and right wheel encoder signals $\dot{\theta}_{PWl}$ and $\dot{\theta}_{PWr}$ in integrators 3501 and 3502 to obtain $\theta_{PWl}$ and $\theta_{PWr}$. These signals are then fed into summers 3503 and 3504 where they are compensated for the effects of cluster rotation by the addition of $\theta_c$ and the quantity $\frac{1}{2}(\theta_{PC}-n)$ derived from summer 3513 and divider 3514.

Figure 36:
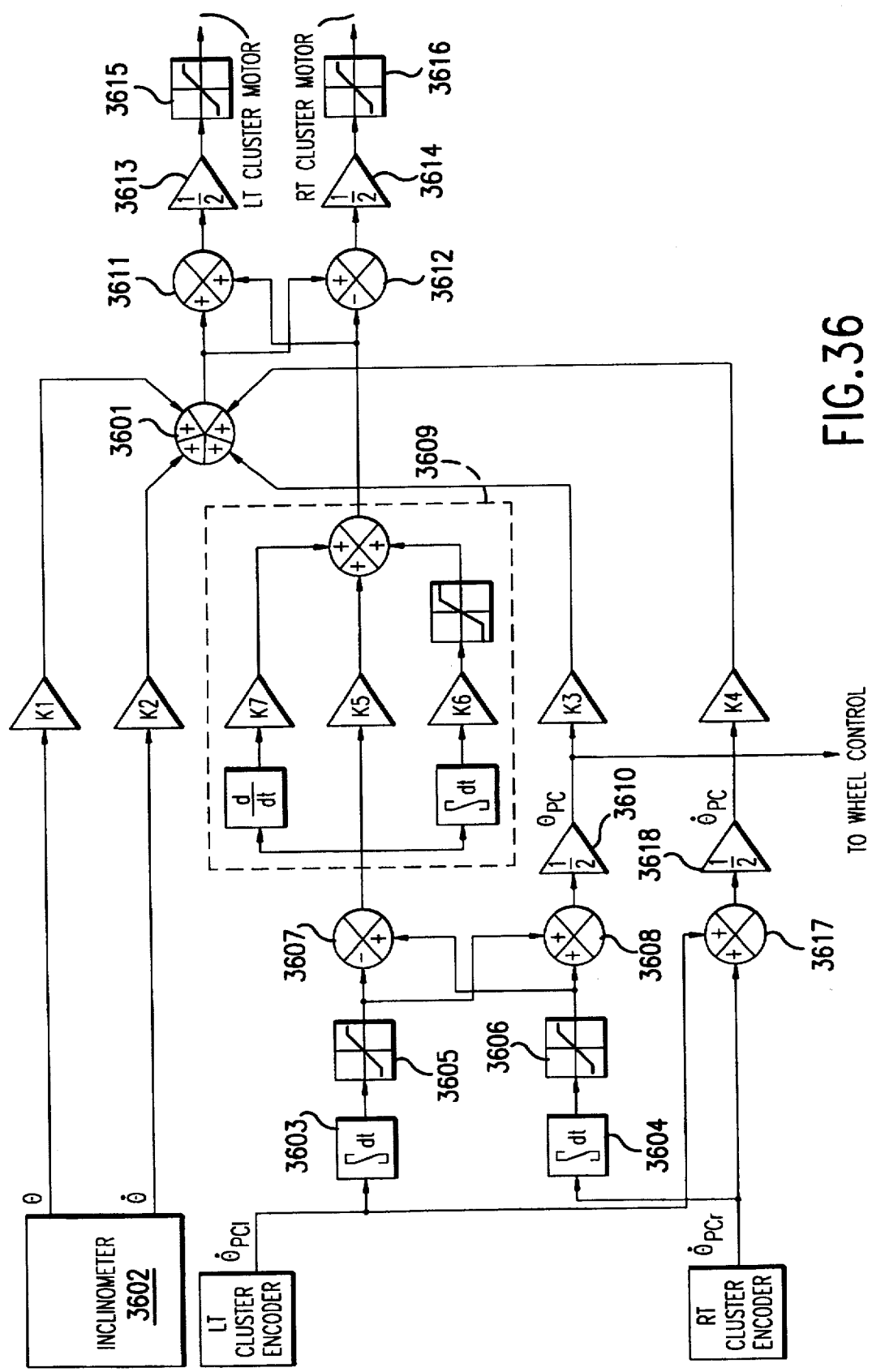
FIGS. 36–38 illustrate the control arrangement for stair-climbing and obstacle traversal achieved by the cluster design of FIGS. 11–26 in accordance with a first embodiment permitting climbing.
Figure 37:
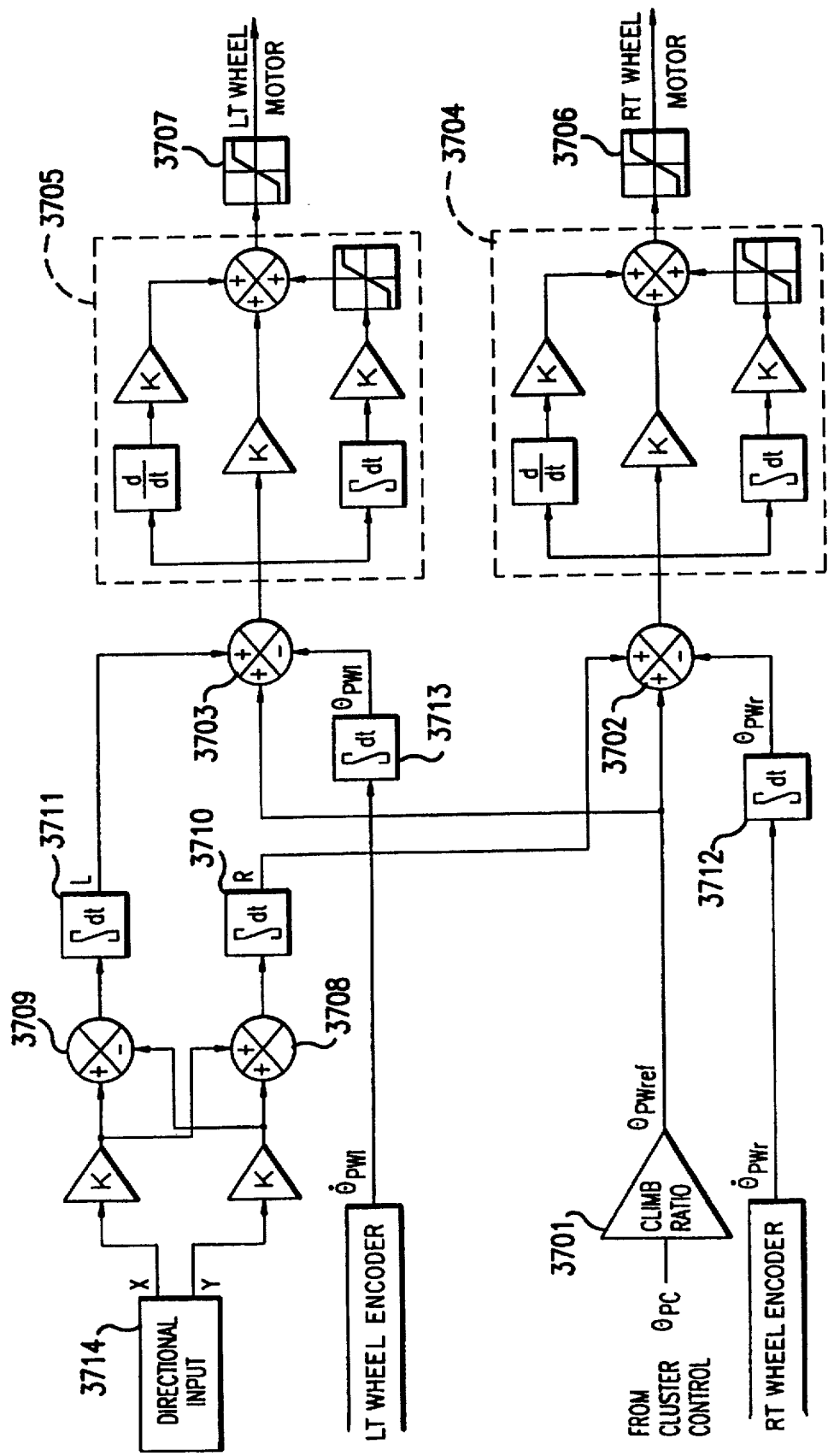

FIGS. 36 and 37 are block diagrams showing control algorithms, suitable for use in conjunction with the control assemblies of FIG. 27, to permit a device according to the embodiment of FIGS. 11–21 to achieve stair-climbing and obstacle traversal in accordance with a first embodiment permitting climbing. In this embodiment the clusters are put in a lean mode, in which they are rotated to attempt to maintain balance in the same general manner as used in normally balancing by wheel rotation as shown in FIG. 33. The same basic equations are used. In FIG. 36, summer 3601 provides correction signals to drive the left and right clusters, derived, among other things, from inclinometer 3602, which provides pitch and pitch rate signals $\theta$ and $\dot{\theta}$ via gains K1 and K2 respectively. The encoder outputs from left and right clusters provide inputs of $\dot{\theta}_{PCl}$ and $\dot{\theta}_{PCr}$, which are integrated by integrators 3603 and 3604 respectively and saturation limited by limiters 3605 and 3606 respectively to produce $\theta_{PCl}$ and $\theta_{PCr}$. These values, when averaged via summer 3608 and divider 3610, result in angular displacement $\theta_{PC}$, which is provided through gain K3 as an additional input to summer 3601. The velocity $\dot{\theta}_{PC}$, determined as the average of $\dot{\theta}_{PCl}$ and $\dot{\theta}_{PCr}$ via summer 3617 and divider 3618, is a further input to summer 3601, this time via gain K4. The output of summer 3601 provides uniform drive of the left and right cluster motors via summers 3611 and 3612, dividers 3613 and 3614, and saturation limits 3615 and 3616 respectively. In addition, however, the twist signal, via PID control loop 3609, provides a differential drive through summers 3611 and 3612 to the left and right cluster motors. The twist signal is derived by using summer 3607 to subtract the signals $\theta_{PCl}$ and $\theta_{PCr}$ from one another.

When the clusters are in the lean mode, the wheels are in a slave mode, in which the wheels are driven as a function of the rotation of the clusters. This is shown in FIG. 37, where $\theta_{PC}$, derived from FIG. 36, as output from divider 3610, is multiplied by a climb ratio constant in gain 3701 to produce $\theta_{PWref}$, a signal that is fed to summers 3703 and 3702 to control the left and right wheel motors via PID control loops 3705 and 3704 and saturation limits 3707 and 3706 respectively. A comparison of FIGS. 37 and 34 show that the wheels are slaved to the clusters in FIG. 37 in the same manner that the clusters are slaved to the vertical radians) input 3413 in FIG. 34. In FIG. 37, the summers 3703 and 3702 have two other inputs each. One input is to track the results of directional inputs 3714 from the joystick, which, in a manner analogous to the processing in FIG. 34, via summers 3709 and 3708 and integrators 3711 and 3710, produces left and right control signals provided as inputs summers 3703 and 3702 respectively. Another input is to track the effects of wheel rotation, so $\theta_{PWl}$ and $\theta_{PWr}$ obtained by running the left and right wheel encoder outputs through integrators 3713 and 3712 are also subtracted by summers 3703 and 3702.

The use of the lean mode provides a powerful and stable method to achieve climbing over obstacles. The climb ratio is determined by the multiplier selected for gain 3701 of FIG. 37. Once this is determined (an item that can be selected manually or automatically determined following obstacle measurement using appropriate spatial sensors or determined in whole or in part empirically based on the state variables themselves) the device can surmount obstacles by the subject's leaning or causing the device to lean in the desired direction. The clusters rotate to maintain balance at the same time that they, with the wheels, are rotating over the obstacles. When the device does not encounter obstacles, it may desirably be operated in the balance mode of FIGS. 33 and 34, with the clusters slaved to $\Pi$ radians and the wheels maintaining balance and causing desired locomotion.

The transitions between wheel balancing mode and cluster lean mode are a matter requiring attention. FIG. 38 is a block diagram of the state of the device, utilizing the embodiment of FIGS. 33–37, among idle, lean, and balance modes. At key times, there will be no state change until it is determined that $(\theta_{PC}-\Pi)$ mod $(2\Pi/3)=0$. This point, at which the center of mass is approximately above the ground contacting pair, is referred to as a "zero crossing" below in this description and in the following claims. At the zero crossing, the cluster is in a position so that, for example, it can be slaved to the $\theta_{PC}=n$ position in the manner of FIG. 34. After beginning at block 3801, the device's initial state is To Idle 3802, from which it enters and remains in Idle 3803, until the Run/Idle switch is moved into the Run position. Once in that position, the device enters the From Idle state 3804. Because there is no absolute reference on either of the clusters, we assume that the device is on flat, level ground at state "From Idle" 3804, where an absolute reference is established. All movement of the clusters determined by the incremental encoders is relative to this reference. At this point, or at any later point, if the Run/Idle switch is moved back to the Idle position, the state returns over path 3812 to the To Idle state 3802. Otherwise, the state becomes Wait 3805, and remains there, until it is determined that $\theta=0$, whereupon the state becomes To Lean 3806. To Lean then moves to Lean 3807, and remains there, unless a switch is moved. If the Lean/Balance switch is then placed in the Balance position and if the clusters experience a zero crossing, then the state moves successively to From Lean 3808, to To Balance 3809, and finally to Balance 3810. If the Lean/Balance switch is moved to the Lean position, the state moves to From Balance 3811 and back to To Lean 3806.

The Wait state allows a smooth startup of the wheel and cluster motors. Without it, the control loop would immediately attempt to compensate for a potentially large error signal from the inclinometer. By starting at a zero crossing, this is avoided. An additional technique of monitoring $\dot{\theta}$ and requiring it to be below a certain threshold at a zero crossing provides an even softer start.

FIGS. 39A–B, 40A–B, 41A–B, and 42A–C illustrate the sequences in a control arrangement, to permit a device according to the embodiment of FIGS. 11–21 to achieve stair climbing in accordance a second embodiment. Four basic sequences of operation are involved in this embodiment: start; reset angle origins; transfer weight; and climb. This embodiment, among others, may be conveniently implemented in the control arrangement of FIG. 27. Block diagrams showing control algorithms for achieving these four sequences are shown in FIGS. 43 (start), 44 (transfer weight), and 45 (climb). (No motion is involved in the reset angle origins sequence, so no control algorithm is shown for this sequence.) FIGS. 39A and 39B illustrate orientation of the cluster in the start sequence. In this sequence, the cluster moves from its normal balancing position on two wheels (FIG. 39A) to a position (shown in FIG. 39B) in which a first pair of wheels (one from each cluster) is on a first level and a second pair of wheels from each cluster is on the next stair. The angle values used in this description in connection with FIGS. 39A through 42C are those resulting from application of the nominal stair and cluster wheel sizes given in Table 1 above. In the start sequence, algorithm shown in FIG. 43, an input is provided of $\theta_{C\ ref}$ as a function of time to the cluster block 4301; the function varies smoothly from the start to the finishing values. Alternatively, an input of $\theta_{PC\ ref}$ can be provided in a similar fashion. Here the input of $\theta_{C\ ref}$ is run through processor 4302 to compute the quantity $$\sin^{-1}\left(\frac{L\sin\theta_C}{L}\right).$$

This quantity, along with $\theta_{C\ ref}$ itself and $\Pi$ are provided as inputs to summer 4303, which computes $$\theta_{PC\ ref} = \Pi - \theta_{C\ ref} - \sin^{-1}\left(\frac{L\sin\theta_{C\ ref}}{L}\right),$$

and provides this quantity as the $\theta_{PC\ ref}$ input to cluster block 4301. The cluster block 4301 is configured as in FIG. 34, except that $\theta_{PC\ ref}$ is no longer fixed at $\Pi$, but varies as just described. The balancing block 4304 is configured as in FIG. 33, but the joystick gains K10 and K11 are set to 0. The summer 4305 provides compensation to the pitch reading of the inclinometer in the same manner as described above in connection with FIG. 35, and the output of summer 4305 is differentiated by differentiator to provide correction of $\dot{\theta}_I$ in the manner described above in connection with FIG. 35, so corrected pitch inputs $\theta$ and $\dot{\theta}$ are provided to the wheel balancing algorithm 4304. The inputs $r\dot{\theta}_{wl}$ and $r\dot{\theta}_{wr}$ to balancing block are also derived in the same manner as described above in connection with FIG. 35.

FIGS. 40A and 40B illustrate orientation of the cluster in the reset angle origins sequence. In this step, the system changes the identity of the "leg" (referred to in item 2 of the conventions discussed after Table 1), for the purpose measuring state variables, from that associated with the lower wheel to that associated with the wheel on the next stair. As a result, since there are three wheels in the cluster, and the total angular distance around the cluster's center is $2\Pi$ radians, this step adds $2\Pi/3$ radians to $\theta_{PC}$ and subtracts $2\Pi/3$ radians from $\theta_C$. There is no motion associated with this step.

FIGS. 41A and 41B illustrate orientation of the cluster in the transfer weight sequence. In this sequence, the weight of the device and of the subject is transferred from the wheel on the lower stair to the wheel on the upper stair. It is here implemented as a pre-programmed operation based on the known geometry of the stairs and the cluster. The value of $\theta_C$ does not change during this sequence. The value of $\theta_{PC}$ must change to reflect the new location of the device's center of mass. To achieve this result, an input of $\theta_{PC\ ref}$ as a function of time is provided on line 3413 to the cluster block shown in FIG. 34 and to the wheel block of FIG. 44. Because this sequence is programmed, the climb block of FIG. 45 and the wheel balance block of FIG. 33 are not active. In FIG. 44, the $\theta_{PC\ ref}$ input is run through divider 441 and then provided to summers 443 and 442 that provide control signals, via PID control loops 445 and 444 and saturation limits 447 and 446, to the left and right motor wheels respectively. The summers 443 and 442 also subtract the values of $\theta_{Pwl}$ and $\theta_{Pwr}$ derived by running the angular velocity information from left and right wheel encoders through integrators 448 and 449 respectively.

FIGS. 42A, 42B, and 42C illustrate orientation of the cluster in the climb sequence. In this sequence, the wheel of the device is rotated in a forward direction toward the next stair riser while simultaneously rotating the cluster to position the next balancing wheel on the next stair tread. The cluster rotation $\theta_c$ is proportional to the distance traveled by the wheel on the stair tread. In this sequence, there is no reference position input. The subject leans or pulls on the hand rail in order to cause the device to move forward. The cluster rotates automatically as a result of the feedback from $\theta_W$ to $\theta_C$ over path 451 in FIG. 45. At the beginning of the climb sequence, x is set to 0. The control algorithm in this sequence needs to monitor either $\theta_C$ or $\theta_{PC}$ and move to the transfer weight sequence when this angle reaches its final value. On the last stair, instead of stopping at the finishing angles shown in FIG. 42C, the process must be stopped at $\theta_c=0$ or $\theta_{PC}=\pi$. Then the device should return to normal balancing mode. The balancing block 453 and the cluster block 452 are as described above in connection with FIGS. 33 and 34 respectively. The derivation of inputs $\theta$, $\dot{\theta}$, $r\dot{\theta}_{wl}$ and $r\dot{\theta}_{wr}$ to the balancing block 453 is as described above in connection with FIGS. 43 and 35. Indeed, the configuration of FIG. 45 is substantially similar to that of FIG. 43, with the singular difference that $\theta_{C\ ref}$ is no longer independently varied, but instead is made a function of $\theta_W$, which is derived by taking the average, via summer 454 and divider 455, of $\theta_{Wl}$ and $\theta_{Wr}$. Accordingly, the $\theta_W$ value on line 451 is run through processor 456 to determine the quantity $$\frac{2\Pi}{3}\cdot\left[\frac{\theta_W}{\left(\frac{D-r-z}{r}\right)}\right],$$

which causes the correct amount of cluster rotation in relation to wheel rotation for the stair geometry and is provided as an input to summer 457 along with the initial value of $\theta_C$, namely $\theta_{C\ rr}$. The output of summer 457 is Although the FIGS. 33–45 show analog control algorithms, they have been implemented in a number of embodiments using microprocessor programmed digital control. However, it is wholly within the scope of the present invention to use direct analog controls as well as a hybrid of analog and digital controls. Analog controls have been successfully implemented, for example, in a version of the device of FIG. 21, using a pair of laterally disposed wheels in lieu of clusters.

What is claimed is:

1. A device, for transporting a human subject over a surface that may be irregular and may include stairs, the device comprising:

(a) a support for supporting the subject, the support having left and right sides and defining fore-aft and lateral planes;

(b) a plurality of support members on each side of the support, each support member being mounted to permit complete travel around an axis and joined to a discrete ground-contacting component, the ground-contacting component having a point of contact with the surface and occupying only a portion of the entire angular distance around the axis; the support and the support members being parts of an assembly;

(c) a motorized drive arrangement, mounted to the assembly, coupled to the support members, for causing locomotion of the assembly and the subject over the surface; and (d) a control loop, in which the motorized drive arrangement is included, for dynamically maintaining stability in the fore-aft plane by operation of the motorized drive arrangement so that the net torque experienced by the assembly about the point of contact with the surface, taking into account torques caused by gravity as well as by all other external forces and by the motorized drive, causes a desired acceleration of the assembly.

2. A device according to claim 1, wherein the axes of all of the support members are substantially collinear.

3. A device according to claim 2, wherein each ground-contacting component is an arcuate element mounted to its respective support member, each support member being rotatably mounted and motor-driven about a central axis defined by the axes.

4. A device according to claim 3, wherein the radially outermost extent of each arcuate element has a generally constant main radius of curvature conforming generally with that of a circle having a radius equal to such extent.

5. A device according to claim 4, wherein each arcuate element has a leading portion and a trailing portion determined in relation to forward motion of the assembly, the leading portion contacting the ground first during forward motion, each portion having a tip, and wherein the radius of curvature of the arcuate element near the tip of each leading portion is somewhat smaller than the element's main radius of curvature.

6. A device according to claim 4, wherein each arcuate element has a leading portion and a trailing portion determined in relation to forward motion of the assembly, the leading portion contacting the ground first during forward motion, each portion having a tip, and wherein the radius of curvature of each arcuate element near the tip of its trailing portion is somewhat smaller than such element's main radius of curvature.

7. A device according to claim 4, wherein each arcuate element has a leading portion and a trailing portion determined in relation to forward motion of the assembly, the leading portion contacting the ground first during forward motion, each portion having a tip, and wherein the radius of curvature of each arcuate element near at least one of its tips differs from the main radius of curvature.

8. A device according to claim 4, wherein each arcuate element has a leading portion and a trailing portion determined in relation to forward motion of the assembly, the leading portion contacting the ground first during forward motion, each portion having a tip, and wherein at least one of the tips of each arcuate element is deflectably mounted and is coupled to a deflection arrangement, so that on actuation the local radius of curvature may be modified.

9. A device according to claim 3, wherein the support is proximate to the ground to permit a subject to stand thereon.

10. A device according to claim 9, further comprising a handle, affixed to the support, having a grip at approximately waist height of the subject, so that the device may be operated in a manner analogous to a scooter.

11. A device according to claim 10, further comprising: a joystick, mounted on the handle, for use by the subject in controlling direction of the device.

12. A device according to claim 9, further comprising: leaning means for sensing leaning of the subject in a given direction and for controlling the motorized drive to cause the device to move in the direction in which the subject may lean.

13. A device according to claim 3, further comprising: drive control means, including the control loop, for driving the support members in a first mode wherein a first arcuate element in each group of axially adjacent arcuate elements generally remains in contact with the ground up to a point near in arcuate distance to where the next succeeding arcuate element comes in contact with the ground, and so on as successive arcuate elements come in contact with the ground, so as to provide substantially continuous rolling motion of the device along the arcuate elements.

14. A device according to claim 13, wherein the drive control means includes means for driving the support members in a second mode to permit ascent and descent of stairs and other surface features.

15. A device according to claim 14, further comprising: means for causing a second one of the arcuate elements of each group to land on a succeeding surface feature, which may include a step, when a first one of the elements of each group is on a preceding surface feature.

16. A device according to claim 1, wherein the ground-contacting components are wheels and the support members on the left and right sides of the vehicle are in each case coupled so as to provide a cluster of wheels on each of the left and right sides of the vehicle respectively, the wheels of each cluster being capable of being motor-driven independently of the cluster.

17. A device according to claim 16, wherein the axes of all of the support members are substantially collinear and define a central axis.

18. A device according to claim 17, wherein the distance from the central axis through a diameter of each wheel is approximately the same for each of the wheels in the cluster.

19. A device according to claim 17, wherein each cluster has two wheels of substantially equal diameter.

20. A device according to claim 17, wherein each cluster has three wheels of substantially equal diameter.

21. A device according to claim 17, further comprising: cluster control means for controlling the angular orientation of each cluster about the central axis; and wheel control means for controlling separately, as to the wheels of each cluster, the rotation of wheels in contact with the ground.

22. A device according to claim 21, wherein the wheel control means has a balance mode, utilizing the control loop, in which the wheels of each cluster in contact with the ground are driven in such a manner as to maintain balance of the device in the fore-aft plane.

23. A device according to claim 21, wherein the wheel control means has a slave mode in which the wheels are driven as a function of the rotation of the clusters; and the cluster control means has a lean mode, utilizing the control loop, in which the clusters are driven in such a manner as to tend to maintain balance of the device in the fore-aft plane while the wheels are in the slave mode, so as to permit the device to ascend or descend stairs or other surface features.

24. A device according to claim 23, wherein the wheel control means has a balance mode, utilizing the control loop, in which the wheels of each cluster in contact with the ground are driven in such a manner as to maintain balance of the device in the fore-aft plane.

25. A device according to claim 24, wherein the wheel control means has a transition mode, used in the transition from the slave mode to the balance mode, operative to prevent entering the balance mode until a zero crossing by the clusters has been sensed.

26. A device according to claim 21, further comprising:
coordination control means for coordinating operation of the cluster control means with that of the wheel control means, the coordination control means having a stair climbing mode to cause steps as follows:
(1) start, in which the assembly, balanced on a first wheel pair, one from each cluster, is disposed adjacent to a stair and the clusters are then rotated so that a second wheel pair is resting on the stair;
(2) transfer weight, in which the weight of the device and the subject is transferred from the lower first wheel pair to the second wheel pair on the stair by motion of the clusters relative to the assembly while the wheels are driven to maintain the position of the clusters relative to the world;
(3) climb, in which the second wheel pair is driven to move the device forward to the riser of the succeeding stair while simultaneously the clusters are driven to position the next wheel pair on the tread of the succeeding stair, this step being carried out while the wheel control means is in the balance mode;
and wherein steps (2) and (3) are alternated until the last stair, at which point normal balance mode of the wheel control means is entered into.

27. A device according to claim 23, further comprising:
slave function adjustment for modifying the function in the slave mode, so that the device may accommodate climbing and descent of stairs and of surface features having varying geometries.

28. A device according to claim 17, further comprising:
a joystick for use by the subject in controlling direction of the device.

29. A device according to claim 17, further comprising:
leaning means for sensing leaning of the subject in a given direction and for controlling the motorized drive to cause the device to move in the direction in which the subject may lean.

30. A device according to claim 29, wherein the leaning means includes a forceplate.

31. A device according to claim 29, wherein the leaning means includes a proximity sensor.

32. A device according to claim 17, wherein the support includes a chair having a seat, hingedly attached to the assembly, so as to have a first position in which the subject may be seated on the seat and a second position in which the subject may stand.

33. A device according to claim 17, wherein the device has a roll axis and a pitch axis, further comprising:
attitude determination means for determining the attitude of the support;
attitude control means for controlling the attitude of the support relative to the ground-contacting member.

34. A device according to claim 23, further comprising:
roll adjustment means for permitting adjustment of the angular orientation of the support with respect to the ground-contacting module about an axis approximately parallel to the roll axis of the device, the roll adjustment means controlled by the attitude control means.

35. A device according to claim 24, further comprising:
banking means for causing the roll adjustment means, in the course of a turn, to bank the support in the general direction of turning.

36. A device according to claim 33, further comprising:
tilt adjustment means for permitting adjustment of the angular orientation of the support with respect to the ground-contacting module about an axis approximately parallel to the pitch axis of the device, the tilt adjustment means controlled by the attitude control means.

37. A device according to claim 17, further comprising:
height adjustment means for adjusting the height of the support relative to the ground.

38. A device according to claim 37, wherein the height adjustment means includes a variable extension between the support and the ground-contacting module.

39. A device according to claim 17, wherein the support is proximate to the ground to permit a subject to stand thereon.

40. A device according to claim 39, further comprising a handle, affixed to the support, having a grip at approximately waist height of the subject, so that the device may be operated in a manner analogous to a scooter.

41. A device according to claim 39, further comprising:
leaning means for sensing leaning of the subject in a given direction and for controlling the motorized drive to cause the device to move in the direction in which the subject may lean.

42. A device according to claim 41, further comprising:
a joystick, mounted on the handle, for use by the subject in controlling direction of the device.

43. A device according to claim 1, wherein the support is proximate to the ground to permit a subject to stand thereon.

44. A device according to claim 43, further comprising:
a handle, affixed to the support, having a grip at approximately waist height of the subject, so that the device may be operated in a manner analogous to a scooter.

45. A device according to claim 43, wherein the ground-contacting components are wheels.

46. A device according to claim 43 further comprising:
leaning means for sensing leaning of the subject in a given direction and for controlling the motorized drive to cause the device to move in the direction in which the subject may lean.

47. A device according to claim 44, further comprising:
a joystick, mounted on the handle, for use by the subject in controlling direction of the device.

48. A device according to claim 1, wherein the control loop includes means for performing the following steps on a cyclical basis:
(1) reading inputs provided by the subject;
(2) reading state variable inputs;
(3) modifying the program state based upon the state variables; and
(4) performing calculations for controlling the motorized drive based on the subject-provided inputs and the state variable inputs.

49. A device, for transporting a payload over a surface that may be irregular and may include stairs, the device comprising:
(a) a support for supporting the payload, the support having left and right sides and defining fore-aft and lateral planes;
(b) a plurality of support members on each side of the support, each support member being mounted to permit complete travel around an axis and joined to a discrete ground-contacting component, the ground-contacting component having a point of contact with the surface and occupying only a portion of the entire angular distance around the axis; the support and the support members being parts of an assembly;

(c) a motorized drive arrangement, mounted to the assembly, coupled to the support members, for causing locomotion of the assembly and the payload over the surface; and (d) a control loop, in which the motorized drive arrangement is included, for dynamically maintaining stability in the fore-aft plane by operation of the motorized drive arrangement so that the net torque experienced by the assembly about the point of contact with the surface, taking into account torques caused by gravity as well as by all other external forces and by the motorized drive, causes a desired acceleration of the assembly.

50. A device according to claim 49, wherein the axes are substantially collinear and define a central axis, and the ground-contacting components are wheels and the support members on the left and right sides of the vehicle are in each case coupled so as to provide a cluster of wheels on each of the left and right sides of the vehicle respectively, the wheels of each cluster being capable of being motor-driven independently of the cluster.

51. A device according to claim 49, wherein the axes substantially collinear and each ground-contacting component is an arcuate element mounted to its respective support member, each support member being rotatably mounted and motor-driven about a central axis defined by the axes.

52. A device according to claim 50, further comprising:

cluster control means for controlling the angular orientation of each cluster about the central axis; and wheel control means for controlling separately, as to the wheels of each cluster, the rotation of wheels in contact with the ground.

53. A device according to claim 52, wherein the wheel control means has a slave mode in which the wheels are driven as a function of the rotation of the clusters; and the cluster control means has a lean mode, utilizing the control loop, in which the clusters are driven in such a manner as to tend to maintain balance of the device in the fore-aft plane while the wheels are in the slave mode, so as to permit the device to ascend or descend stairs or other surface features.

54. A device according to claim 52, wherein the wheel control means has a balance mode, utilizing the control loop, in which the wheels of each cluster in contact with the ground are driven in such a manner as to maintain balance of the device in the fore-aft plane.

* * * * *